(12) United States Patent
Shenoy et al.

(10) Patent No.: US 12,388,645 B2
(45) Date of Patent: Aug. 12, 2025

(54) TECHNIQUES FOR BINDING TOKENS TO A DEVICE AND COLLECTING DEVICE POSTURE SIGNALS

(71) Applicant: OKTA, INC., San Francisco, CA (US)

(72) Inventors: Vinayak Shenoy, Seattle, WA (US); Yang Chen, East Brunswick, NJ (US); Lana Young Choi, San Francisco, CA (US); Tanvir Ahmed, Kirkland, WA (US); Dipti Shiralkar, San Jose, CA (US)

(*) Notice: Subject to any disclaimer, the term of this patent is extended or adjusted under 35 U.S.C. 154(b) by 112 days.

(21) Appl. No.: 18/362,798

(22) Filed: Jul. 31, 2023

(65) Prior Publication Data
US 2025/0047489 A1 Feb. 6, 2025

(51) Int. Cl.
*H04L 29/06* (2006.01)
*H04L 9/14* (2006.01)
*H04L 9/30* (2006.01)
*H04L 9/32* (2006.01)

(52) U.S. Cl.
CPC ........... *H04L 9/3213* (2013.01); *H04L 9/14* (2013.01); *H04L 9/3073* (2013.01); *H04L 9/3218* (2013.01)

(58) Field of Classification Search
CPC ....... H04L 9/3213; H04L 9/14; H04L 9/3073; H04L 9/3218; H04L 9/3247
See application file for complete search history.

(56) References Cited

U.S. PATENT DOCUMENTS

| | | | |
|---|---|---|---|
| 6,842,863 B1* | 1/2005 | Fox | H04L 9/3263 |
| | | | 713/157 |
| 11,456,870 B2* | 9/2022 | Subramaniam | G06Q 30/04 |
| 2019/0124070 A1* | 4/2019 | Engan | H04L 9/3247 |
| 2019/0312730 A1* | 10/2019 | Engan | H04L 63/126 |
| 2021/0243177 A1* | 8/2021 | Burson | H04L 63/0807 |
| 2022/0417241 A1* | 12/2022 | Zilbershtein | H04L 9/3247 |

\* cited by examiner

*Primary Examiner* — Harunur Rashid
(74) *Attorney, Agent, or Firm* — Holland & Hart LLP

(57) ABSTRACT

Methods, systems, and devices for user authentication are described. A first device may generate a keypair at a secure module. The keypair includes a public key and a private key that is stored at the secure module. The first device may authenticate the first device and a user of the first device with an identity management platform and may generate a header at an authentication client based on the authenticating. The header may be generated in accordance with an application-layer protocol for demonstrating proof-of-possession (DPoP). The first device may collect device signals and sign the header with the private key and the device signals based on a web client invoking the authentication client via a loopback interface and the authentication client accessing the secure module. The first device may transmit the signed header to a server of the identity management platform via the web client.

14 Claims, 9 Drawing Sheets

TECHNIQUES FOR BINDING TOKENS TO A DEVICE AND COLLECTING DEVICE POSTURE SIGNALS

FIELD OF TECHNOLOGY

The present disclosure relates generally to identity and access management systems, and more specifically to techniques for binding tokens to a device and collecting device posture signals.

BACKGROUND

An organization may provide users of the organization with access to resources, such as software applications, that may be reviewed for security purposes, compliance, or license management, among other examples. Organizations that include several users must therefore manage several different access privileges. The necessity of managing identity and access privileges for several users may impose a considerable burden on the organizations.

In some cases, organizations may use tools, such as identity and access management tools, to help manage identity and access privileges for users of the organizations. For some use cases, however, conventional identity and access management tools may be deficient or sub-optimal in some current configurations.

SUMMARY

A method for user authentication on a first device by an apparatus is described. The method may include generating a proof-of-possession keypair at a secure module of the first device, where the proof-of-possession keypair includes a public key and a private key, and where the private key is stored at the secure module, performing a sequence of operations to authenticate the first device and a user of the first device with an identity management platform, generating a header at an authentication client of the first device based on the authenticating, where the header is generated in accordance with an application-layer protocol for demonstrating proof-of-possession, signing the header with the private key based on a web client of the first device invoking the authentication client via a loopback interface and the authentication client accessing the secure module via a system interface, and transmitting the signed header to a server associated with the identity management platform via the web client.

An apparatus for user authentication on a first device is described. The apparatus may include one or more memories storing processor executable code, and one or more processors coupled with the one or more memories. The one or more processors may individually or collectively operable to execute the code to cause the apparatus to generate a proof-of-possession keypair at a secure module of the first device, where the proof-of-possession keypair includes a public key and a private key, and where the private key is stored at the secure module, perform a sequence of operations to authenticate the first device and a user of the first device with an identity management platform, generate a header at an authentication client of the first device based on the authenticating, where the header is generated in accordance with an application-layer protocol for demonstrating proof-of-possession, sign the header with the private key based on a web client of the first device invoking the authentication client via a loopback interface and the authentication client accessing the secure module via a system interface, and transmit the signed header to a server associated with the identity management platform via the web client.

Another apparatus for user authentication on a first device is described. The apparatus may include means for generating a proof-of-possession keypair at a secure module of the first device, where the proof-of-possession keypair includes a public key and a private key, and where the private key is stored at the secure module, means for performing a sequence of operations to authenticate the first device and a user of the first device with an identity management platform, means for generating a header at an authentication client of the first device based on the authenticating, where the header is generated in accordance with an application-layer protocol for demonstrating proof-of-possession, means for signing the header with the private key based on a web client of the first device invoking the authentication client via a loopback interface and the authentication client accessing the secure module via a system interface, and means for transmitting the signed header to a server associated with the identity management platform via the web client.

A non-transitory computer-readable medium storing code for user authentication on a first device is described. The code may include instructions executable by a processor to generate a proof-of-possession keypair at a secure module of the first device, where the proof-of-possession keypair includes a public key and a private key, and where the private key is stored at the secure module, perform a sequence of operations to authenticate the first device and a user of the first device with an identity management platform, generate a header at an authentication client of the first device based on the authenticating, where the header is generated in accordance with an application-layer protocol for demonstrating proof-of-possession, sign the header with the private key based on a web client of the first device invoking the authentication client via a loopback interface and the authentication client accessing the secure module via a system interface, and transmit the signed header to a server associated with the identity management platform via the web client.

Some examples of the method, apparatus, and non-transitory computer-readable medium described herein may further include operations, features, means, or instructions for receiving a nonce via the web client based on validating the header with the identity management platform using the public key, obtaining one or more device signals at the authentication client of the first device in response to receiving the nonce and based on the web client invoking the authentication client via the loopback interface, signing the header with the private key, the nonce, and the one or more device signals based on the authentication client accessing the secure module via the system interface, and transmitting the header to the server via the web client.

In some examples of the method, apparatus, and non-transitory computer-readable medium described herein, each device signal of the one or more device signals correspond to a respective attribute of one or more attributes collectable by the authentication client.

In some examples of the method, apparatus, and non-transitory computer-readable medium described herein, the one or more attributes include a status of one or more anti-virus products on the first device, a status of a firewall on the first device, a status of one or more auto-update settings on the first device, a status of one or more internet settings on the first device, a status of a user account control on the first device, a proof of management status, or a status of an operating system security center service, or any combination thereof.

Some examples of the method, apparatus, and non-transitory computer-readable medium described herein may further include operations, features, means, or instructions for receiving an access token and a refresh token via the web client based on validating the header with the identity management platform using the public key, where the access token and the refresh token may be bound to the first device and include the header.

Some examples of the method, apparatus, and non-transitory computer-readable medium described herein may further include operations, features, means, or instructions for transmitting a request to a resource server for access to a resource, where the request may be transmitted via the web client and includes the access token and the header and obtaining access to the resource based on the access token and the header.

Some examples of the method, apparatus, and non-transitory computer-readable medium described herein may further include operations, features, means, or instructions for transmitting, to the server associated with the identity management platform, a request for a second access token based on identifying an expiration of the access token, where the request includes the refresh token and the header and obtaining the second access token based on the access token and the header.

In some examples of the method, apparatus, and non-transitory computer-readable medium described herein, the sequence of operations may be performed in response to a request, from the user, to access a resource via the web client.

A method for user authentication on a first device by an apparatus is described. The method may include generating a first proof-of-possession keypair and a second proof-of-possession keypair at a secure module of the first device, generating a device credential at an authentication client of the first device based on the first proof-of-possession keypair, and obtaining a device-bound user credential via the authentication client, where the device-bound user credential is obtained from a second device associated with the identity management platform based on the device credential and the second proof-of-possession keypair.

An apparatus for user authentication on a first device is described. The apparatus may include one or more memories storing processor executable code, and one or more processors coupled with the one or more memories. The one or more processors may individually or collectively operable to execute the code to cause the apparatus to generate a first proof-of-possession keypair and a second proof-of-possession keypair at a secure module of the first device, generate a device credential at an authentication client of the first device based on the first proof-of-possession keypair, and obtain a device-bound user credential via the authentication client, where the device-bound user credential is obtained from a second device associated with the identity management platform based on the device credential and the second proof-of-possession keypair.

Another apparatus for user authentication on a first device is described. The apparatus may include means for generating a first proof-of-possession keypair and a second proof-of-possession keypair at a secure module of the first device, means for generating a device credential at an authentication client of the first device based on the first proof-of-possession keypair, and means for obtaining a device-bound user credential via the authentication client, where the device-bound user credential is obtained from a second device associated with the identity management platform based on the device credential and the second proof-of-possession keypair.

A non-transitory computer-readable medium storing code for user authentication on a first device is described. The code may include instructions executable by a processor to generate a first proof-of-possession keypair and a second proof-of-possession keypair at a secure module of the first device, generate a device credential at an authentication client of the first device based on the first proof-of-possession keypair, and obtain a device-bound user credential via the authentication client, where the device-bound user credential is obtained from a second device associated with the identity management platform based on the device credential and the second proof-of-possession keypair.

In some examples of the method, apparatus, and non-transitory computer-readable medium described herein, the device-bound user credential may be obtained in response to a request, from a user of the first device, to log into the first device.

In some examples of the method, apparatus, and non-transitory computer-readable medium described herein, the device-bound user credential satisfies one or more assurances associated with accessing a resource via the first device.

Some examples of the method, apparatus, and non-transitory computer-readable medium described herein may further include operations, features, means, or instructions for performing a sequence of operations to register the first device with an identity management platform, where obtaining the device-bound user credential from the server associated with the identity management platform may be based on the first device being registered.

DETAILED DESCRIPTION

Figure 1:
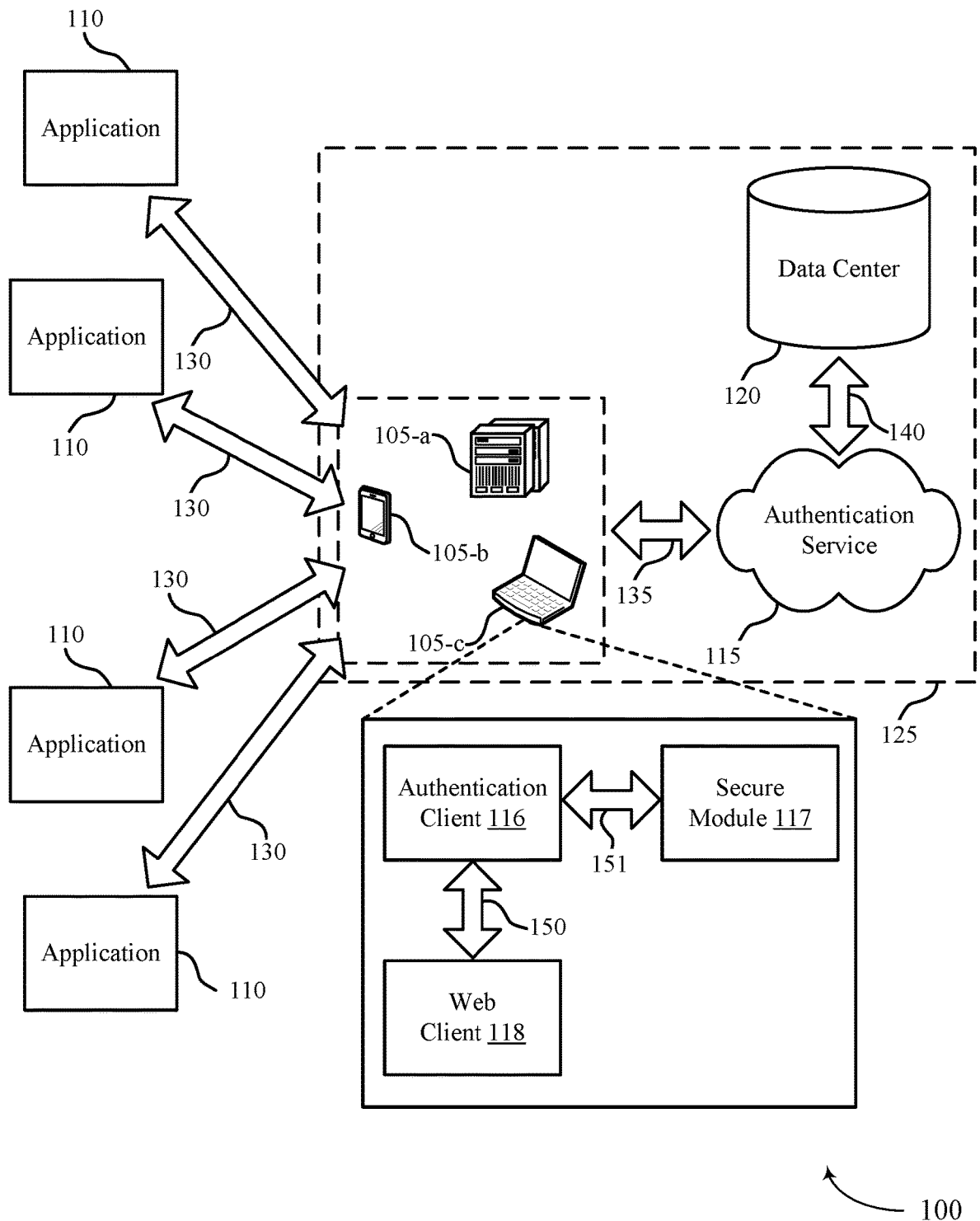
FIGS. 1 and 2 each illustrate an example of a system that supports techniques for binding tokens to a device and collecting device posture signals in accordance with aspects of the present disclosure.

An organization may use an identity and access management platform to help manage identity and access privileges for users of the organization. In some examples, an identity and access management platform may be referred to as an identity provider (IdP). A user of the organization may use a device to access (or attempt to access) one or more resources of the organization via the IdP. For example, the user may perform one or more operations via the client device to authenticate an identity of the user with the IdP for access to a resource of the organization. In response to successfully authenticating the identity of the user, the IdP may issue a token (e.g., identifier of an interaction session) to the user for accessing the resource. In some examples, however, the token issued to the user for access to the resource may be vulnerable to token theft, in which a malicious user may obtain unauthorized access to the token and, accordingly, unauthorized access to the resource. Token theft may degrade security for the organization.

Various aspects of the present disclosure generally relate to techniques for binding tokens to a device and collecting device posture signals and, more specifically, to a framework for signing a header (e.g., a proof-of-possession header) and collecting device signals via a loopback interface. For example, the user of the organization may use an authentication client (e.g., a software application that support one or more authentication protocols, such as multifactor authentication) on the client device to access a resource of the organization, for example, via a web client (e.g., browser) on the client device. The client device may generate a keypair (e.g., an asymmetric keypair that includes a private key and a public key) via a secure module (e.g., a crypto-processor) on the client device. The client device may store the private key of the generated keypair at the secure module and may share the public key of the generated keypair with the authentication client (e.g., and the IdP). The client device may perform one or more operations to authenticate the user (e.g., and the client device) with the IdP. In response to successfully authenticating the user (e.g., and the client device), the IdP may transmit an authorization code to the client device via the web client. In response, the web client may invoke the authentication client via a loopback interface. For example, the web client may use the loopback interface to request that the authentication client generate a proof-of-possession header. The authentication client may generate the proof-of-possession header and may access the secure module to sign the generated header. In some examples, the generated header may be signed with a keypair (e.g., a private key of a keypair), such as a pre-enrolled keypair (e.g., pre-enrolled with the IdP) or another keypair (e.g., a new keypair) that the client device may request the secure module generate. The authentication client may transmit the signed header to the web client (e.g., via the loopback interface) and the web client may transmit the signed header and the authorization code to the IdP. In response, the IdP may verify the signature of the header with the public key (e.g., may validate the signed header).

In some examples, such as examples in which the IdP may successfully validate the signed header, the IdP may transmit (e.g., issue, provide) a device-bound token to the client device. That is, the IdP may provide the client device with a token that is bound to the client device. The user may use the device-bound token to access the resource via the client device. In some examples, by invoking the authentication client via the loopback interface, the web client may obtain a signed header in a relatively secure manner (e.g., may guarantee the secure module) and may collect and add device signals to a demonstrated proof-of-possession, which may enable the IdP to issue a device-bound token to the client device. Additionally, by enabling the IdP to issue a device-bound token to the client device, the IdP may reduce a likelihood of token theft, thereby providing increased reliability and security for the organization. Aspects of the disclosure are initially described in the context of systems for distributed computing and process flows. Aspects of the disclosure are further illustrated by and described with reference to apparatus diagrams, system diagrams, and flowcharts that relate to techniques for binding tokens to a device and collecting device posture signals.

FIG. 1 illustrates an example of a system 100 for distributed computing (e.g., cloud computing) that supports techniques for binding tokens to a device and collecting device posture signals in accordance with various aspects of the present disclosure. The system 100 includes client devices 105, applications 110, authentication service 115, and data storage 120. The authentication service 115 (e.g., an IDP) may be an example of a public or private cloud network. A client device 105 may access authentication service 115 over network connection 135. The network may implement transmission control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other company type (e.g., organization type).

A client device 105 may interact with multiple applications 110 using one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication service 115 to store, manage, and process the data associated with the interactions 130. In some examples, the client device 105 may have an associated security or permission level. A client device 105 may have access to some applications, data, and database information within authentication service 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

Authentication service 115 may offer cloud-based services to the client devices 105, the applications 110, or both. In some examples, the authentication service 115 may support a database system such as a multi-tenant database system. In such cases, authentication service 115 may serve multiple client devices 105 with a single instance of software. However, other types of systems may be implemented, including—but not limited to—client-server systems, mobile device systems, and mobile network systems. Authentication service 115 may receive data associated with interactions 130 from the client device 105 over network connection 135, and may store and analyze the data. In some examples, authentication service 115 may receive data directly from an interaction 130 between an application 110 and the client device 105. In some examples, the client device 105 may develop applications to run on authentication service 115. Authentication service 115 may be implemented using remote servers. In some examples, the remote servers may be examples of data storage 120.

Data storage 120 may include multiple servers. The multiple servers may be used for data storage, management, and processing. Data storage 120 may receive data from authentication service 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 (an identity and access management platform, a software platform that supports identity and access management) may include or be otherwise associated with client devices 105, authentication service 115, and data storage 120. In some examples, data processing may occur at any of the components of subsystem 125, or at a combination of these components. In some examples, servers may perform the data processing. The servers may be or be associated with a client device 105, data storage 120, or authentication service 115.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

An organization may provide users of the organization (e.g., employees, contractors) with access to resources, such as software applications, which may necessitate that the organization manage different access privileges for different users. Managing identity and access privileges for users may impose a considerable burden on the organizations. In some examples, an organization may use the subsystem 125 (e.g., an identity and access management platform, also referred to as an identity provider (IdP), to help manage identity and access privileges for users of the organization. To increase security for the organization, the subsystem 125 may perform one or more operations to validate an identity of a user prior to authorizing the user to access one or more resources of the organization. As an illustrative example, the subsystem 125 may request that the user perform a token-based authentication protocol, in which the subsystem 125 may verify the identity of the user and, in response, provide the user with a token (e.g., cryptograph information) that may be associated with the user (e.g., specific to the user), and that may be used by the user to access one or more resources of the organization.

For example, the user may use the client device 105-c to transmit, to the authentication service 115, a request for access to a resource of the organization (e.g., a website). The authentication service 115 (or one or more other components of the subsystem 125) may perform one or more operations to validate an identity of the user. For example, the authentication service may identify the user (e.g., based on the request), and prompt the user to provide a credential. The authentication service 115 may validate the user based on the credential and, in response, may provide (e.g., output, issue, grant) the user a token for accessing the website. Accordingly, during a time period in which the token may be valid, the user may use the token to access the resource (e.g., may refrain from re-entering credentials each time the user may return to the same website or one or more other resources that may be protected with the same token). In some examples, tokens provide the organization with increased security for resources of the organization (e.g., that may be managed by the subsystem 125) and increased control over user access to the resources.

In some examples, one or more users of the organization may access (or attempt to access) resources of the organization via a managed or an unmanaged device (e.g., the user may be an employee that works remotely), such as a client device 105-c. In such examples, tokens issued to the user (or the client device 105-c) may be vulnerable (e.g., susceptible) to token theft, in which a malicious user may obtain unauthorized access to a token. The malicious actor may use the token to obtain unauthorized access to resources associated with (e.g., protected by) the token, which may reduce (or otherwise degrade) security for the organization. In some examples, a managed device may be relatively more secure than an unmanaged device. As such, it may be desirable for the authentication service to determine whether a device (e.g., the client device 105-c) is from a managed device or an unmanaged device. In some examples, the authentication service 115 may have (e.g., implement) one or more policies associated with unmanaged device (e.g., may reject unmanaged devices).

In some examples, an authentication client 116 may support one or more techniques for binding tokens to a device and collecting device posture signals, as described herein, which may decrease a likelihood of token theft. For example, the authentication client 116 may be associated with the subsystem 125. That is, the authentication client 116 may be part of (e.g., included in a same enterprise as) or may be otherwise associated with the subsystem 125, such that a trust relationship (e.g., a trust chain) may be established between the authentication client 116 and the authentication service 115. For example, the authentication client 116 may be registered with the authentication service 115 (e.g., the IdP) and information (e.g., tokens, keys) usable for authenticating the identity of the user of the client device 105-c (e.g., and the client device 105-c) may be exchanged between the authentication client 116 and the authentication service 115. In some examples, a malicious actor may obtain unauthorized access to a token (or some other type of sensitive information). A token that is bound to a device (e.g., a device-bound token) may be associated with an identity of the device. As such, a token that is bound to the client device 105-c may be used (e.g., may only be used) to access resources associated with the token via the client device 105-c and a malicious user that lacks access to the client device 105-c may be unable to use (or obtain) one or more tokens that may be bound to the client device 105-c.

In accordance with one or more techniques for binding tokens to a device and collecting device posture signals, as described herein, the authentication client 116 may enable the subsystem 125 (e.g., the authentication service of the subsystem 125) to bind tokens to a secure module 117 of the client device 105-c (or another of the client devices 105). As described herein, a secure module of a device may refer to a dedicated chip or microprocessor capable of carrying out cryptographic operations (e.g., an onboard security processor, a secure crypto-processor, a trusted platform module (TPM)). In some examples, a secure module of a device may be used to create and store cryptographic keys, which may be embedded with multiple physical security measures and, as such, may be relatively secure (e.g., tamper resistant). In other words, the secure module 117 may be an example of a module that securely stores keys and is capable of generating credentials (e.g., using one or more hardware components). The secure module 117 may be a chip (e.g., a separate chip) on a motherboard of the client device 105-c and may be capable of device attestation (e.g., may generate a manifest of hardware on the client device 105-c and cryptographically to attest it).

For example, the client device 105-c may include a secure module 117, which may generate one or more private-public keypairs. A private-public keypair may include a public key and a private key. In some examples, a private-public keypair may be referred to as a proof-of possession keypair. The client device 105-c may also include the authentication client 116. The secure module may store the private key and may output the public key to the authentication client 116 (e.g., may share the public key with the authentication client 116). For example, the secure module 117 may output the public key to the authentication client 116 in accordance with an enrollment process (e.g., an authenticator enrollment process, a device enrollment process, a user enrollment process), an integration process (e.g., a join process), an authentication process (e.g., multi-factor authentication process), or a registration process, among other examples. In some examples, the secure module 117 may be a trusted platform module (TPM) or a system on a chip (e.g., a T2 chip).

For example, the client device 105-c may perform a sequence of operations to authenticate the client device 105-c, or the user of the client device 105-c, or both, with the subsystem 125 (e.g., with the authentication service 115). In some examples, such as based on the authentication, the client device 105-c may obtain an authorization code from the subsystem 125 (e.g., from the authentication service 115) via a web client 118. The web client 118 may invoke a loopback interface 150 to request a signed header from the authentication client 116 (e.g., may request a signed header through a loopback call). As described herein, a loopback interface may refer to an interface or channel for routing electronic signals or digital data streams to (e.g., back to) a source without intentional processing or modification. In some examples, a loopback interface associated with a device may be used to identify the device. For example, the loopback interface 150 may have an associated address that may be static (e.g., may not change based on network topology changes). In response, the authentication client 116 may generate (e.g., construct) a header. In some examples, the authentication client 116 may generate the header in accordance with an application-layer protocol for demonstrating proof-of-possession (DPoP). In such examples, the header may be an example of a DPoP header. For example, the header may include a hash of some selected data in a request (e.g., an HTTP request) such as a timestamp. The authentication client 116 may use the private key to sign the header. For example, the authentication client 116 may use a system interface 151 (e.g., a system API) to call the secure module 117 and access the private key. The authentication client 116 or the secure module 117, or both, may sign the header with the private key. In some examples, the authentication client 116 may call the secure module 117 in a same or relatively similar way as the authentication client 116 may call the secure module 117 to unlock the private key with a biometric. In some examples, the header may be signed with the private key and one or more device signals (e.g., device signals indicative of whether the device is managed or unmanaged, such as an attestation about whether the device is managed). In other words, the client device 105-c may report one or more device signals in the header (e.g., the DPoP claim).

The client device 105-c may transmit the signed header (e.g., the signed DPoP header) and the authorization code to the subsystem 125 (e.g., to the authentication service 115). For example, the client device 105-c may include the signed header and the authorization code in a header of an HTTP message (e.g., in an HTTP header). The authentication service 115 may have access to (e.g., possess) the public key. For example, the client device 105-c may share the public key with the authentication service via the authentication client 116 or via some other component. The authentication service 115 may use the public key to verify the signed header and, in response, may transmit a nonce (e.g., a number or nonsensical word used once) to the client device 105-c. That is, the client device 105-c may receive the nonce via the web client 118. A nonce may be an example of a random or pseudo-random number that may be used in communication protocols. In some examples, the nonce may be an example of a cryptographic nonce used to increase a level of privacy for communications. For example, the nonce may be an arbitrary and randomly generated number that may be used once (e.g., may only be used once) and, in some examples, may include a timestamp. The nonce may, in some examples, reduce a likelihood of malicious attacks (e.g., replay attacks) and reduce a likelihood of previous communications being reused by malicious users. The nonce may be generated in accordance with one or more authentication protocols, cryptographic hash functions, or initialization vectors, among other examples.

In some examples, such as in response to receiving the nonce, the web client 118 may pass the nonce to the authentication client via the loopback interface 150. The authentication client 116 may use the system interface 151 to access the secure module 117 to sign the nonce (e.g., and the signed header, such as to reduce a likelihood of a phishing attack) with the private key. For example, the authentication client 116 may sign the nonce and the signed header with the private key based on the authentication client 116 using the system interface 151 to call the secure module 117. The client device 105-c may transmit the signed nonce and signed header to the authentication service 115. In response to receiving the signed nonce and signed header, the authentication service 115 may transmit (e.g., issue, send) a token to the client device 105-c with the signed header (e.g., a hash of the DPoP public key). The token may be an example of an access token (e.g., an encoded data object that includes one or more claims, a JavaScript object notation (JSON) web key claim, a cnf claim). For example, the authentication service 115 may include the signed header in a claim of an access token and may transmit the access token to the client device 105-c. In other words, the authentication service 115 may populate a claim in the access token (e.g., the JSON web key claim) with the signed header. Additionally, or alternatively, the token may be an example of a refresh token, a device token, or an internet data exchange (IDX) cookie, among other examples. In some examples, by including the signed header in the token, the token may be bound to the client device 105-c. As such, a malicious user (e.g., a threat actor) may lack a mechanism for obtaining (e.g., phishing, intercepting, capturing, receiving) the token.

In some examples, such as after the token is issued, the client device 105-c may prove possession of the private key, for example, by adding the signed header to a request that the client device may transmit to a resource provider (e.g., an application server) to gain access to a resource. The signed header may provide (e.g., carry) a DPoP proof for the request. As such, the resource provider may validate the request based on the signed header (e.g., the signature). In other words, the resource server may be configured to determine whether a received token is device-bound (e.g., the resource server may be DPoP aware). The resource server may be configured to determine whether a received token is device-bound (e.g., may become DPoP aware) based on one or more directories provided by (e.g., published by) the subsystem 125 that the resource server may implement (e.g., may incorporate at the application side).

In some examples, the resource server may be associated with the subsystem 125 (e.g., may use the authentication service 115 for authentication of users). In such examples, the request may include the token issued by the authentication service. For example, the public key may be embedded in the token and the resource server may use the public key to validate the signature of the header. In some other examples, resource server may validate the signature of the header by querying the authentication service 115 (e.g., at a DPoP endpoint of the authentication service 115). Additionally, or alternatively, an application associated with the resource server (e.g., a client application) may request that the secure module 117 of the client device 105-c generate keypairs (e.g., for the application and one or more other applications, for each application associate with the resource server) using the web client via the loopback interface 150. In some examples, invoking the authentication client 116 via the loopback interface 150, the web client 118 may obtain the signed header from the authentication client 116 in a relatively secure way and may enable the client device 105-c to obtain a device-bound token, which may increase security at the client device 105-c for one or more post-authentication threat scenarios. In other words, one or more techniques for binding tokens to a device and collecting device posture signals, as described herein, may reduce a likelihood of token theft, session hijacking, and unauthorized access to resources (or accounts), among other benefits.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
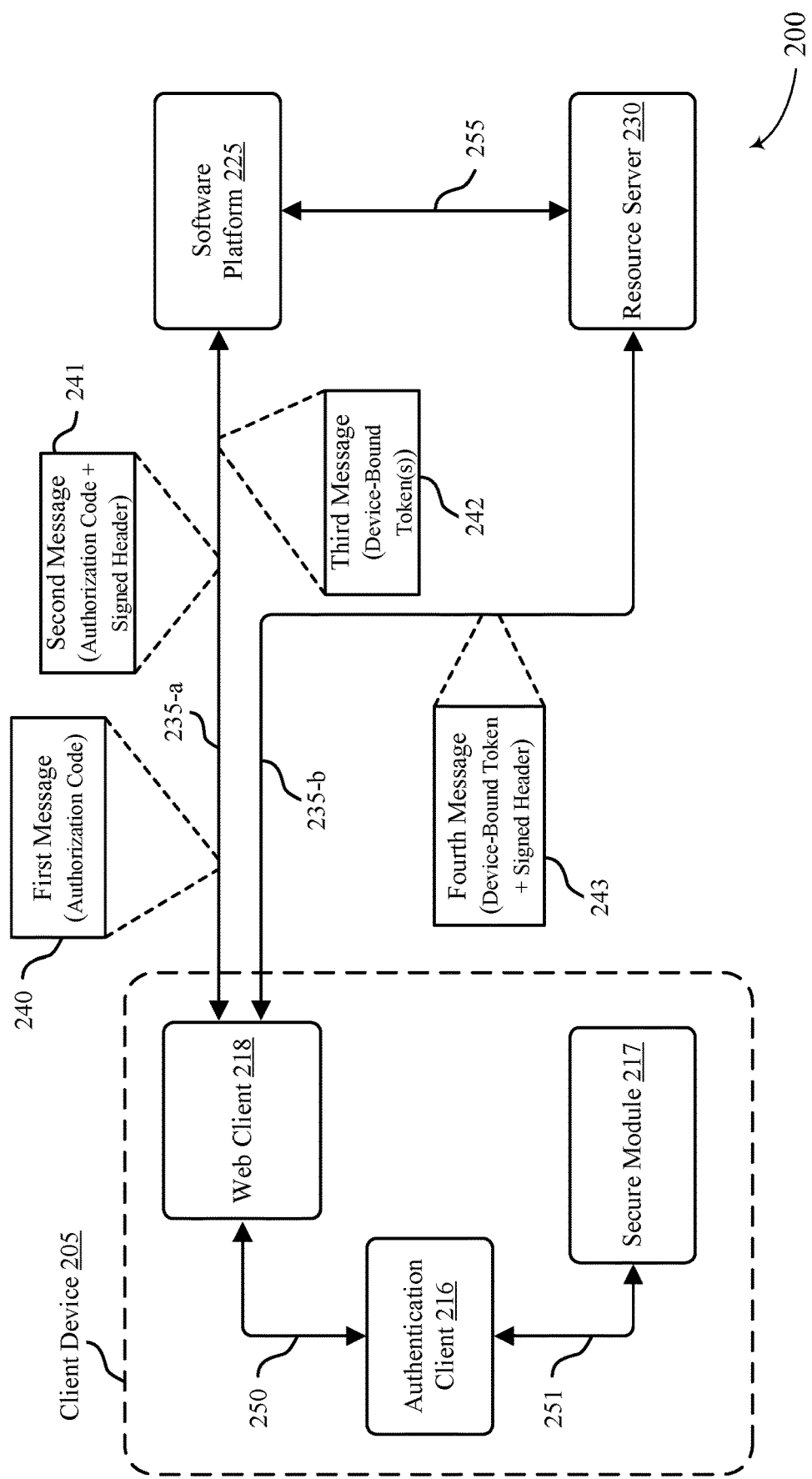

FIG. 2 shows an example of a system 200 that supports techniques for binding tokens to a device and collecting device posture signals in accordance with aspects of the present disclosure. The system 200 (e.g., an architecture) includes a client devices 205, which may be an example of a client device illustrated by and described with reference to FIG. 1. For example, the client device 205 may be associated with an organization or a user of the organization, or both. As illustrated in the example of FIG. 2, the client device 205 may include an authentication client 216 and a secure module 217, which may be example of the corresponding components illustrated by and described with reference to FIG. 1. Additionally, in the example of FIG. 2, the client device 205 may also include a web client 218 (e.g., a web browser, an application client). The web client 218 may communicate with the authentication client 216 via a loopback interface 250, which may be an example of a loopback interface (e.g., a loopback channel) illustrated by and described with reference to FIG. 1. The authentication client 216 may communicate with the secure module 217 via a system interface 251 (e.g., a system API).

The system 200 also includes a software platform 225, which may be an example of a subsystem 125 illustrated by and described with reference to FIG. 1. For example, the software platform 225 may be an example of an identity and access management platform (e.g., a software platform that supports identity and access management), which may also be referred to as an IdP. The software platform 225 may provide one or more services for the organization. For example, the organization may use the software platform 225 to manage identifying information associated with users of the organization. In some examples, the software platform 225 may provide services for users of the organization, such as a workforce (e.g., employees, contractors) of the organization or customers of the organization, or both. In some examples, the software platform 225 may store and manage digital identities of users. For example, the organization may use the software platform 225 to manage access to resources associated with the organization. In such examples, a user of the organization may use the software platform 225 to manage identifying information associated with the user, such that the user may access the resources. For example, the software platform 225 may manage log-in requests from the user, verify authenticators used for the log-in requests, and authorize access to resources associated with the request. In other words, the software platform 225 may provide one or more identity (and access management) services to the organization, such as directories that store the users and attributes of the users, integrations for connecting software applications used by the organization (or by the users), workflows for automating identity management, authentication services (e.g., multi-factor authentication, SSO), security services (e.g., services for identifying malicious attacks), and data collection and reporting, among other examples. In some examples, the software platform 225 (e.g., an authorization server) may include an authentication service, which may be an example of an authentication service illustrated by and described with reference to FIG. 1.

The software platform 225 may, in some examples, be associated with a resource server 230. The resource server 230 may be an example of a resource server described with reference to FIG. 1. For example, the resource server may store (or otherwise provide access to) resources of the organization (e.g., that may be managed by the software platform 225). The client device 205 may communicate with the software platform 225 and the resource server 230 via the web client 218. For example, the client device 205 may use a client interface 235-a to communicate with the software platform 225 via the web client 218, and may use a client interface 235-b to communicate with the resource server 230 via the web client 218. The client interfaces 235 may be examples of interfaces that support one or more communication protocols, such as HTTP protocols. In some examples, the client interfaces 235 may be examples of APIs. The software platform 225 may communicate with the resource server 230 via a server interface 255. The server interface 255 may be a same type of interface as, or a different type of interface from, the client interfaces 235. The server interface 255 may be an example of an interface that supports communications in accordance with one or more processes for introspection (e.g., an ability of a program to examine the type or properties of an object at runtime) or validation, or both.

In some examples, the client device 205 may be an example of a device (e.g., an unmanaged device) that the user of the organization may use to access (or attempt to access) one or more resources of the organization (e.g., a resource that is managed at the software platform 225 and that is stored at the resource server 230). In such examples, a token issued to the user (e.g., by the software platform 225) for access to the resource (e.g., at the resource server 230) may be vulnerable to token theft, in which a malicious user may obtain unauthorized access to the token. The malicious actor may use the token to obtain unauthorized access to the resource, which may degrade security for the organization.

In some other examples, however, the system 200 may support one or more techniques for binding tokens to a device and collecting device posture signals, as described herein, which may reduce a likelihood of token theft. For example, as illustrated in the example of FIG. 2, a user of the client device 205 may use the authentication client 216 to access a resource via the web client 218 (e.g., a single-page application (SPA) running on the web client 218, which may also be referred to as a browser). The web client 218 may be in communication with (e.g., may make authorized calls to) the resource server 230.

The client device 205 may generate an asymmetric key-pair via the secure module 217. The client device 205 may store a private key of the generated keypair at the secure module 217 and may share a public key of the generated keypair with the authentication client 216 (e.g., and the software platform 225). The client device 205 may perform one or more operations (e.g., a series of one or more operations, such as in accordance with a multi-factor authentication protocol) to authenticate the user (e.g., and the client device) with the software platform 225 (e.g., via the authentication client 216). In response to successfully authenticating the user (e.g., and the client device 205), the software platform 225 may transmit a first message 240 to the client device 205 (e.g., to the web client 218 of the client device 205). The first message 240 may include an authorization code.

In some examples, such as after authentication, the web client 218 (e.g., the client SPA, the SPA in the browser) may obtain a signed header (e.g., a DPoP proof signed with the private key) from the authentication client 216. For example, the web client 218 may transmit a request for a signed header to the authentication client 216 via the loopback interface 250. In response, the authentication client 216 may access the private key stored in the secure module 217 via the system interface 251, and may sign the generated header with the private key. The authentication client 216 may transmit (e.g., or otherwise provide) the signed header to the web client 218 (e.g., via the loopback interface 150). For example, the authentication client 216 may generate an object (e.g., a JWT, a cookie), which it may pass to the software platform 225 via the web client 218 in a header (e.g., a DPoP header) or payload of an http request. The web client 218 may sign a DPoP proof with the private key using the loopback interface 250) (e.g., a loopback channel) of the authentication client 216. The web client 218 may transmit a second message 241 to the software platform 225 that includes the authorization code and signed header. That is, the web client 218 may send the signed header with the authorization code to the software platform 225. In other words, the web client 218 may send the signed DPoP proof as a DPoP header with the authorization code to the software platform 225.

In response to receiving the second message 241, the software platform 225 may verify the signed header (e.g., the signature of the DPoP proof) with the public key. In some examples, based on successfully validating (e.g., verifying) the signed header, the software platform 225 may transmit a third message 242 that includes a device-bound token. That is, the software platform 225 may provide the client device 205 (e.g., via the web client 218) with a token that is bound to the client device 205.

[1] In some examples, such as prior to transmitting the third message 242, the software platform 225 may transmit (e.g., return) a nonce (e.g., a DPoP nonce) to the web client 218 and the web client 218 may sign the nonce (e.g., with the DPoP proof). That is, the web client 218 may transmit another request for the authentication client 216 to sign the nonce and the header (e.g., again) with the private key via the loopback interface 250. The authentication client 216 may access the private key at the secure module 217 to sign the nonce and the header. In other words, the software platform 225 may send a one-time nonce to the web client 218, the web client 218 may pass the nonce to the authentication client 216 through the loopback interface 250 (e.g., through a loopback call) and, upon or after receiving the nonce, the authentication client 216 may add device signals to the header (e.g., may attest, via the header, whether the device is managed). The device signals may include data (e.g., security) that pertains to the client device 205 (e.g., a device posture of the client device 205, a security posture of the client device 205). For example, the device signals may include signals collectable by the software platform 225 (or another third-party IdP). In some examples, the device signals may include an attestation of management status (e.g., proof of management status), an operating system version, a status of the operating system, firewall settings, a status of a firewall, antivirus settings, a status of anti-virus products on the client device 205, a screen-lock status, a risk score (e.g., from one or more integrations), a status of one or more auto-update settings on the client device 205, a status of one or more internet settings on the client device 205, a status of a user account control on the client device 205, or a status of an operating system security center service, among other examples.

In other words, the nonce may trigger the authentication client 216 to sign the header with device signals (e.g., and the nonce) using the private key (e.g., the transport private key). That is, the client device 205 may receive a nonce via the web client 218 based on validating the header with the software platform 225 (e.g., using the public key or some other authentication method). In some examples, the client device 205 may obtain one or more device signals at the authentication client 216 in response to receiving the nonce (e.g., from the web client 218 via the loopback interface) and may sign the header with the private key, the nonce, and the one or more device signals based on accessing the secure module 217 via the system interface 251. In some examples, a device signal may correspond to an attribute of the client device 205 that may be collectable by the authentication client 416. For example, a device signal may include a status of one or more anti-virus products on the client device 205, a status of a firewall on the client device 205, a status of one or more auto-update settings on the client device 205, a status of one or more internet settings on the client device 205, a status of a user account control on the client device 205, or a status of an operating system security center service, among other examples of device attributes that may be collectable by the authentication client 216.

The authentication client 216 may provide the signed nonce and header (e.g., the updated DPoP header) to the web client 218. The web client 218 may transmit the signed header to the software platform 225. The software platform 225 may perform one or more operations to verify the signature of the header. In some examples, in response to verifying the signature of the header (e.g., verifying the updated DPoP header), the software platform 225 may transmit (e.g., issue, send) the third message that includes a device-bound token. The device-bound token may include the signed header (e.g., the DPoP proof) in a claim (e.g., a cnf claim or JSON web token (JWT) claim). In some examples, the web client 218 may verify the claim against an endpoint (e.g., a DPoP endpoint) of the software platform 225, which may reduce a likelihood of a malicious user obtaining the device-bound token (e.g., may reduce a likelihood of token theft).

In some examples, the device-bound token may include an access token that the user may use to access the resource (e.g., the SPA) via the client device 205. For example, the web client 218 may transmit a fourth message 243 to the resource server 230. The fourth message 243 may include the device-bound token (e.g., the access token) with the signed header and may request access to the resource. In some examples, to prevent replay attack of the DPoP, the DPoP sent to the resource server 230 (e.g., via the fourth message 243) may be a signed (e.g., newly signed) JWT with a unique JTI (or nonce, if challenged by the software platform 225). The claim (e.g., the DPoP claim) may also include updated values of one or more device signals (e.g., device signals re-collected by the authentication client 216). In such an example, the user may obtain access to the resource (e.g., the SPA) via the client device 205 based on the device-bound token (e.g., the access token) including the signed header. In some examples, the resource server 230) may determine whether to allow access based on one or more of the device signals (e.g., a status of the device, such as whether the device is managed or not).

Additionally, or alternatively, the device-bound token may include a refresh token that the user may use to obtain another access token (or to renew the existing access token) via the client device 205. For example, the software platform 225 may issue multiple device-bound tokens, such as an access token and a refresh token. The access token may be valid for a duration. In such an example, based on (e.g., in response to) identifying an expiration of the duration (e.g., an expiration of the access token, an expiration of a lifetime associated with the access token), the client device 205 (e.g., via the web client 218) may transmit another message to the software platform 225. The other message may include a request for another access token and may include the refresh token with the signed header. In some examples, the authentication client 216 may recollect device signals (e.g., to reflect up to date device status), and added the recollected device signals to the header (e.g., to an updated DPoP header, the newly signed DPoP header), which may be sent (e.g., in the other message including the refresh token) to the software platform 225 (e.g., the token endpoint, the IdP). The software platform may use the device signals to define an access token policy. For example, the software platform 225 (e.g., the IdP) may check the device signals (e.g., the management status of the device) and determine whether token renewal is allowed. In such an example, the client device 205 may obtain another access token from the software platform 225 based on the refresh token including the signed header (e.g., and based on validation of the signature of the header using the public key). In some examples, by invoking the authentication client 216 via the loopback interface 250, the web client 218 may sign the header in a relatively secure manner, which may lead to increased security for the organization and may provide a mechanism for granting access to a resource with proof-of-presence and possession assurance based on device access (e.g., in response to the user successfully logging-in to the client device 205). For example, it may be relatively difficult for the web client 218 to access the secure module 217 in relatively reliable or secure manner. Therefore, by accessing the secure module 217 via the authentication client 216 (e.g., by invoking the authentication client via the loopback interface 250) the web client 218 may sign the header with the private key in a more secure manner, which may provide increased reliability and security for the organization (e.g., may enable the header to be sent to the software platform 225 in a way that is non-fungible, non-duplicable, and non-repeatable).

Figure 3:
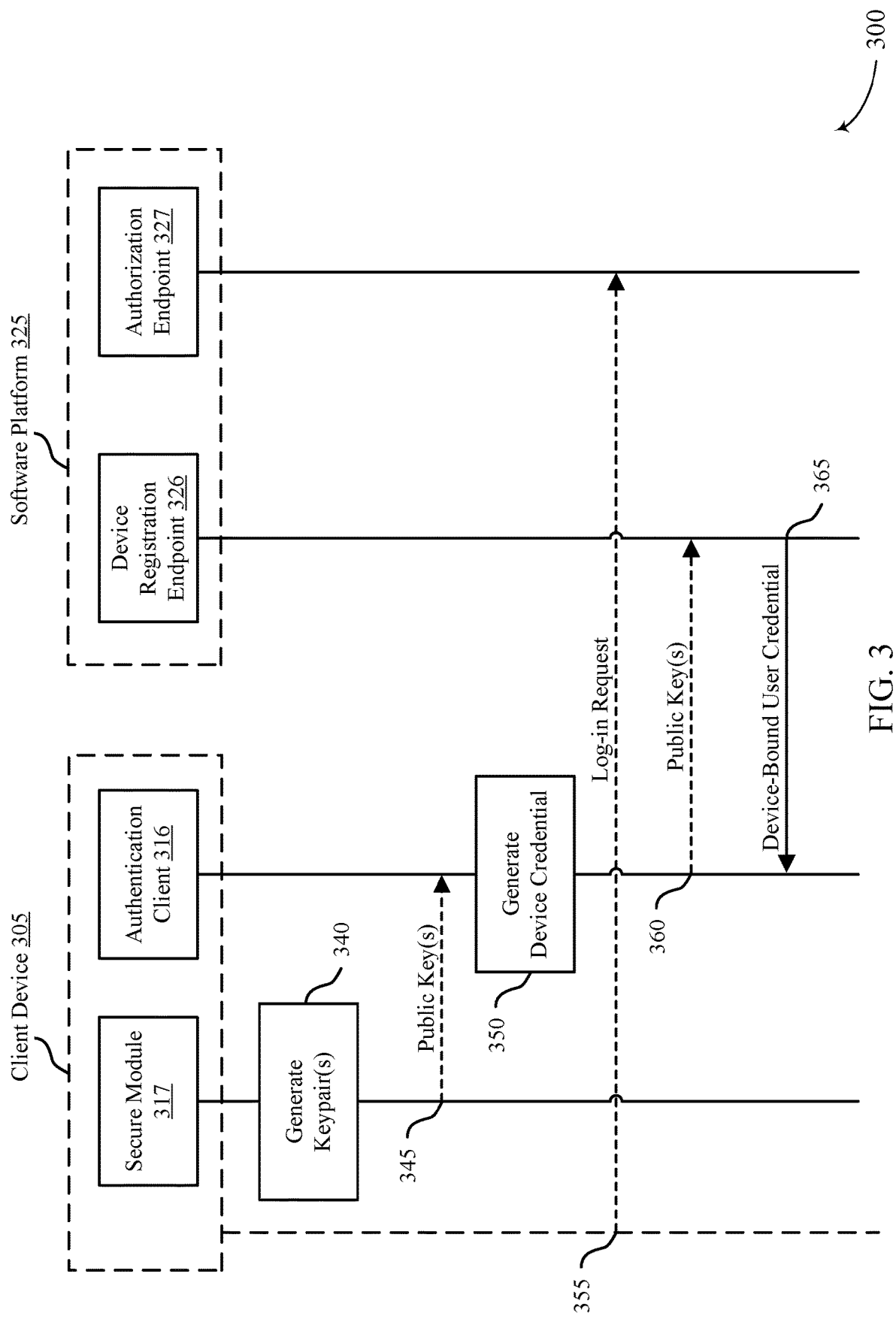
FIGS. 3 and 4 each show an example of a process flow that supports techniques for binding tokens to a device and collecting device posture signals in accordance with aspects of the present disclosure.

FIG. 3 shows an example of a process flow 300 that supports techniques for binding tokens to a device and collecting device posture signals in accordance with aspects of the present disclosure. The process flow 300 may implement or be implemented by aspects of the system 100 and the system 200. For example, one or more aspects of the process flow 300 may be implemented by a client device 305, which may be an example of a client device illustrated by and described with reference to FIGS. 1 and 2. In some examples, the client device 305 may be used by a user (e.g., an administrator) of an organization. The client device 305 may include an authentication client 316 and a secure module 317, which may be example of the corresponding components illustrated by and described with reference to FIGS. 1 and 2.

Additionally, one or more aspects of the process flow 300 may be implemented at a software platform 325, which may be an example of a software platform illustrated by and described with reference to FIG. 2. For example, the software platform 325 (e.g., an identity and access management platform) may be associated with (e.g., provide services for) the organization. In the example of FIG. 3, the software platform 325 may be associated with the authentication client 316. The software platform 325 may include (e.g., host) one or more endpoints, such as a device registration endpoint 326 and an authorization endpoint 327. The device registration endpoint 326 and the authorization endpoint 327 may be associated with an authentication service of the software platform 325, which may be an example of an authentication service illustrated by and described with reference to FIG. 1. For example, the device registration endpoint 326 may be used to perform one or more operations associated with registration of the client device 305 (or the user) with the software platform 325 and the authorization endpoint 327 may perform one or more operations associated with authenticating the client device 305 (or the user). In some examples, the authorization endpoint 327 may attest (e.g., consent to, grant) permissions that a web client (e.g., browser, web-based application) of the client device 305 may use to allow access to a resource.

In the following description of the process flow 300, the information communicated between the client device 305 and the software platform 325 may be performed in different orders or at different times than shown. Additionally, or alternatively, some operations may be omitted from the process flow 300 and other operations may be added to the process flow 300. In some examples, two or more operations may be combined in the process flow 300. The process flow 300 may provide for increased security at the client device 305, among other benefits.

In some examples, one or more techniques for binding tokens to a device and collecting device posture signals, as described herein, may provide a framework for the user of the client device 305 to obtain a device-bound token in response to logging-in to the client device 305 (e.g., based on performing one or more methods, such as multi-factor authentication or another suitable method, to log-in to the client device 305). The device-bound token may represent a device session (e.g., a session of the client device 305). In other words, such techniques may enable the user to log into the client device 305 and, in response, the software platform 325 may generate and provide the user with a device-bound primary credential that may satisfy one or more assurances of the organization for accessing organization resources, and that may be used by the user to obtain tokens (e.g., or other types of information that may be used by the user for accessing one or more of the organization resources), thereby providing increased end-to-end security for the organization (e.g., security from a time of an initial log-in to the client device 305 for accessing resources of the organization to a time associated with an end of use of the client device 305 for accessing resources of the organization).

At 340, the client device 305 may generate one or more keypairs at the secure module 317 of the client device 305. For example, the client device 305 may generate a first proof-of possession keypair (e.g., a device keypair) and a second proof-of possession keypair (e.g., a transport keypair).

In some examples, at 345, the secure module 317 may share one or more public keys (e.g., a respective public key of the first proof-of possession keypair and the second proof-of possession keypair) with the authentication client 316. Additionally, or alternatively, the secure module 317 may store one or more private keys (e.g., a respective private key of the first proof-of possession keypair and the second proof-of possession keypair) at the secure module 317.

At 350, the client device 305 may generate a device credential at the authentication client 316 based on the one or both of the keypairs. For example, the client device 305 may use the first proof-of possession keypair (e.g., the device keypair) to generate the device credential.

In some examples, at 355, the user may transmit a log-in request to the software platform 325 (e.g., the authorization endpoint 327 of the software platform 325) that includes the generated device credential.

In some examples, at 360, the authentication client 316 may share the one or more public keys (e.g., the respective public keys of the first proof-of possession keypair and the second proof-of possession keypair) with the software platform 325 (e.g., with the device registration endpoint 326 of the software platform 325) based on the log-in request (e.g., in accordance with a protocol associated with the log-in request). For example, the log-in request may trigger the authentication client 316 to share the one or more public keys with the device registration endpoint 326. In some examples, the authentication client 316 may share the one or more public keys with the device registration endpoint 326 in accordance with one or more registration (or enrollment) protocols.

At 365, the client device 305 may obtain a device-bound user credential (e.g., a user credential that is bound to the client device 305) from the device registration endpoint 326 via the authentication client 316. That is, the device-bound user credential may be obtained from the software platform 325 (e.g., an identity management platform, an IdP) based on the device credential and one or more of the generated keypairs (e.g., the transport keypair). For example, the client device 305 may use the secure module 317 to generate a device keypair and a transport keypair. The device keypair may be used by the client device 305 to generate the device credential, which may be used with the transport key pair to obtain the device-bound user credential from the software platform 325. The device-bound user credential may be used on the client device 305 (e.g., only on the client device 305). For example, the device-bound user credential may satisfy one or more assurances associated with accessing the resource via the client device 305. That is, the device-bound user credential may be bound to the client device 305, such that the device-bound user credential (e.g., a cookie) may be used (e.g., only be used) on the client device 305 with the software platform 325. In some examples, by providing the client device a device-bound user credential, the software platform 325 may provide increased end-to-end security for the organization.

Figure 4:
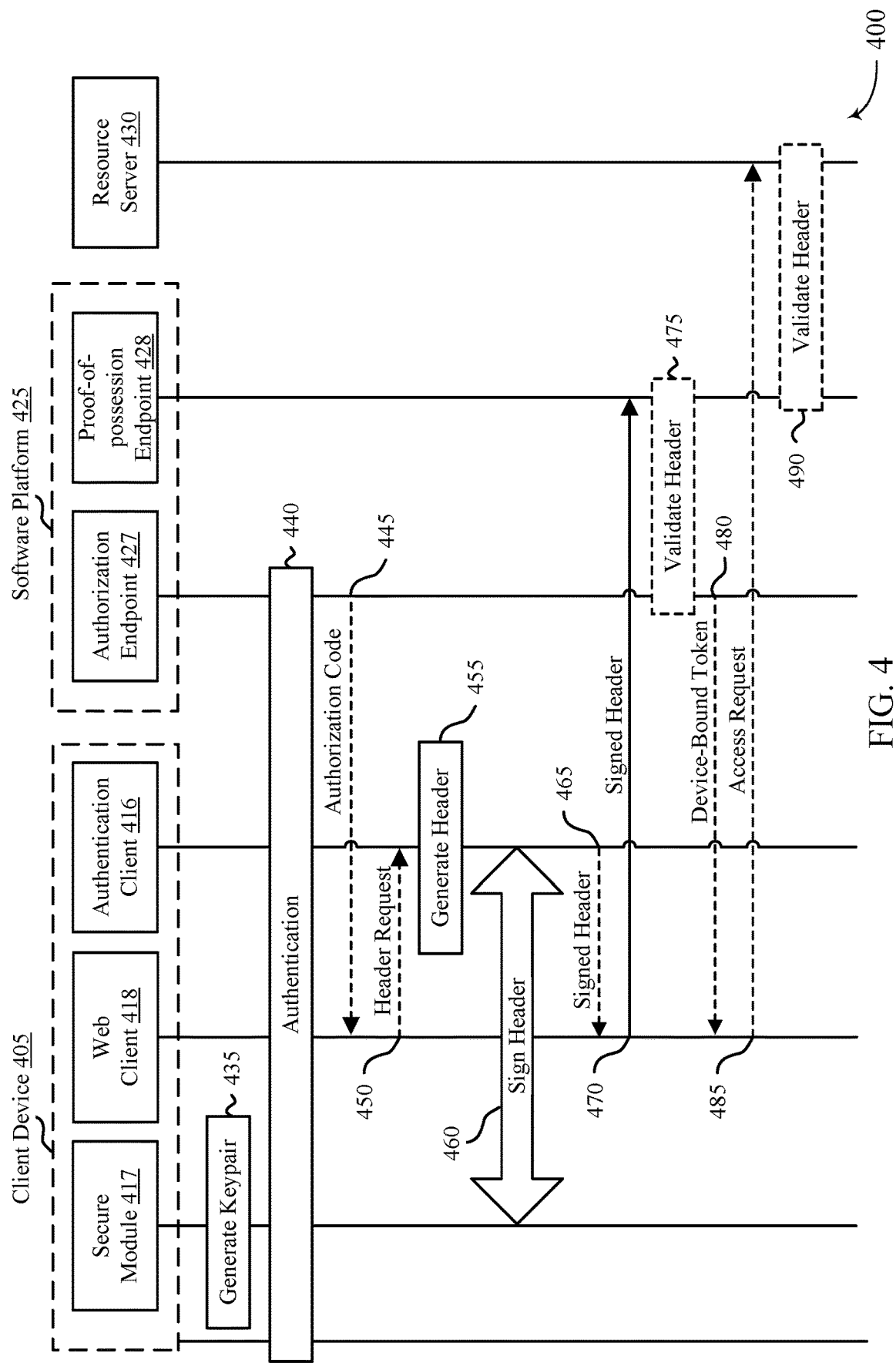

FIG. 4 shows an example of a process flow 400 that supports techniques for binding tokens to a device and collecting device posture signals in accordance with aspects of the present disclosure. The process flow 400 may implement or be implemented by aspects of the system 100, the system 200, and the process flow 300. For example, one or more aspects of the process flow 400 may be implemented by a client device 405, which may be an example of a client device illustrated by and described with reference to FIGS. 1 through 3. In some examples, the client device 405 may be used by a user (e.g., an administrator) of an organization. The client device 305 may include an authentication client 416 and a secure module 417, which may be example of the corresponding components illustrated by and described with reference to FIGS. 1 through 3. Additionally, the client device 405 may include a web client 418, which may be an example of a web client illustrated by and described with reference to FIGS. 1 and 2. The authentication client 416 may communicate with the web client 418 via a loopback interface, which may be an example of a loopback interface (e.g., a loopback channel) illustrated by and described with reference to FIGS. 1 through 3. The authentication client 416 may communicate with the secure module 417 via a system interface, which may be an example of a system interface illustrated by and described with reference to FIGS. 1 and 2.

Additionally, one or more aspects of the process flow 300 may be implemented at a software platform 425 (e.g., one or more servers associated with a software platform), which may be an example of a software platform illustrated by and described with reference to FIGS. 2 and 3. For example, the software platform 425 (e.g., an identity and access management platform) may be associated with (e.g., provide services for) the organization. In the example of FIG. 4, the software platform 425 may be associated with the authentication client 416. The software platform 425 may include (e.g., host) one or more endpoints, such as an authorization endpoint 427 and a proof-of-possession endpoint 428 (e.g., a DPoP endpoint). The authorization endpoint 427 and the proof-of-possession endpoint 428 may be associated with an authentication service of the software platform 425, which may be an example of an authentication service illustrated by and described with reference to FIG. 1. For example, the authorization endpoint 427 may perform one or more operations associated with authenticating the client device 405 (or the user). In some examples, the authorization endpoint 327 may consent to permissions that the web client 418 may use to allow access to a resource (e.g., a resource of the organization, a resource stored at the resource server 430). The proof-of-possession endpoint 428 may perform one or more operations associated with managing (e.g., orchestrating) one or more proof-of possession protocols, for example, in accordance with entities that may implement proof-of possession protocols. That is, the proof-of-possession endpoint 428 may manage operations (e.g., communications) that may be performed in accordance with proof-of possession protocols. In some examples, the proof-of-possession endpoint 428 may manage DPoP protocols with entities that implement DPoP, such as the resource server 430.

In the following description of the process flow 400, the information communicated between the client device 405, the software platform 425, and the resource server 430 may be performed in different orders or at different times than shown. Additionally, or alternatively, some operations may be omitted from the process flow 400 and other operations may be added to the process flow 400. In some examples, two or more operations may be combined in the process flow 400. The process flow 300 may provide for increased security at the client device 405, among other benefits.

The client device 405 may perform one or more operations to obtain a user credential. For example, the client device 405 may perform an authentication protocol (e.g., multi-factor authentication) to obtain the user credential. In some examples, the user may be an example of a device-bound user credential illustrated by and described with reference to FIG. 3. In some other examples, the user credential may be an example of a username and password. For example, the client device 405 may use the user credential to perform authentication with an IdP to access a resource. In some examples, after authentication, the client device 405 may receive a token (e.g., artifact) from the IdP that may be used to access the resource. In some examples, however, the token may be unbound (e.g., bare). For example, the IdP may lack a mechanism to bind the token without support from the web client 418 (e.g., without browser support). In other words the IdP may lack a mechanism for managing (e.g., controlling) how or when the web client 418 exchanges tokens and, as such, may lack a mechanism for granting access to a resource with proof-of-presence and possession assurance based on device access (e.g., in response to the user successfully logging-in to the client device 405). Additionally, in some examples, the IdP may lack a mechanism for embedding device signals with tokens. In some examples, an IdP of an enterprise may support mechanisms for granting access to a resource with proof-of-presence and possession assurance based on previous access associated with the enterprise. However, such mechanisms may be constrained to components of the enterprise, such as an operating system platform of the enterprise. For example, the enterprise may couple libraries of the enterprise with applications of the enterprise to use operating system-level artifacts (e.g., primary refresh tokens (PRTs)). In other words, such mechanisms may be constrained to services and resources associated with a single enterprise and may be relatively rigid (e.g., may not be used with applications, platforms, IdPs, or operating systems that are unassociated with the organization).

In some other examples, the software platform 425 (e.g., and the client device 405) may support one or more techniques for binding tokens to a device and collecting device posture signals, as described herein, which may enable the software platform 425 (e.g., an identity and access management platform, an IdP) to grant the user of the client device 405 access to a resource with proof-of-presence and possession assurance based on device access (e.g., in response to a log-in, such as an initial log-in, to the client device 405). In other words, one or more techniques for binding tokens to a device and collecting device posture signals, as described herein, may enables the user to log-in to the client device 405 (e.g., once) and, in response, the client device 405 may become registered with the software platform 425 (e.g., the IdP) and provide access (e.g., relatively silent SSO) to one or multiple resources of the organization that may not be duplicated on another device. For example, through the authentication client 416, the web client 418 may use a loopback interface (e.g., loopback channel) to access keys, leverage keys, and implement proof-of-possession. In other words, in accordance with one or more techniques for binding tokens to a device and collecting device posture signals, as described herein, the web client 418 may leverage the authentication client 416 and the loopback interface (e.g., the loopback channel) to generate, manage, rotate, and invoking a keypair, which may enable the software platform 425 to provide the client device 405 with device-bound tokens. In some examples, such techniques may provide for increased security associated with transmission of device signals (e.g., may enable attestation of device signals) and may be device, operating system, and browser agnostic e.g., may be used across one or more applications, platforms, IdPs, or operating systems that may be unassociated with the organization or each other).

At 435, the client device 405 may generate a keypair (e.g., a proof-of-possession key pair, such as a transport keypair) at the secure module 417 of the client device 405. The keypair may include a private key and a public key. The secure module 417 may share the public key with the authentication client 416 and may store the private key at the secure module 417.

At 440, the client device 405 may perform a sequence of operations to authenticate the client device 405 (e.g., and the user of the client device 405) with the software platform 425 (e.g., the identity management platform). For example, the client device 405 may perform one or more operations in accordance with a multi-factor authentication protocol. In some examples, the client device 405 may authenticate the client device 405.

At 445, the client device 405 may receive, via the web client 418, an authorization code from the software platform 425 (e.g., from the authorization endpoint 427 of the software platform 425). The authorization code may be an example of an authorization code illustrated by and described with reference to FIGS. 1 and 2. For example, the client device 405 may receive the authorization code from the software platform 425 based on the software platform 425 verifying the user (e.g., via the authentication at 440). That is, in response to completing the authentication at 440, the software platform 425 may supply the client device 405 with the authorization code, which the client device 405 may use to obtain (e.g., procure) one or more tokens (e.g., an access token, a refresh token).

In some examples, the software platform 425 (e.g., the server of the software platform 425) may issue a piece of artifact for trust (e.g., a token, a cookie). In such examples, the software platform may link the artifact with the public key. As an illustrative example, the client device may exchange (e.g., with the software platform 425) the authorization code for a token. In such an example, the software platform 425 may link the public key to the token (e.g., add the hash of the public key in the access token claim).

In some examples, at 450, the web client 418 may transmit a request to the authentication client 416 for a signed header (e.g., a signed DPoP header). In other words, the web client 418 (e.g., a browser) may call the authentication client 416 via the loopback interface to request a signed DPoP header. That is, the authorization code may be received by web client 418 from a server associated with the software platform 425 and may pass the authorization code to the authentication client 416 through a loopback call.

At 455 the client device 405 may generate a header (e.g., a DPoP header) at the authentication client 416 in response to receiving the authorization code (e.g., the authentication client 416 may generate the header in response to the request from the web client 418). The header may be an example of a DPoP header illustrated by and described with reference to FIGS. 1 and 2. For example, the header may be generated in accordance with DPoP (e.g., an application-layer protocol for DPoP).

At 460, the client device 405 may sign the header with the private key based on the authentication client 416 accessing the secure module 417 via the system interface. That is, the authentication client 416 may sign the header (e.g., in a relatively secure manner) by calling the secure module 417 and using the private key (e.g., the transport private key) to sign the header.

In some examples, at 465, the authentication client 416 may transmit the signed header to the web client 418 via the loopback interface. That is the authentication client 416 may send the signed DPoP header to the software platform 425 via the web client 418 (e.g., the browser).

At 470, the web client 418 may transmit the header (e.g., the signed header) to the software platform 425 via the web client 418. In some examples, the web client 418 may transmit the signed header to the software platform 425 with the authorization code. For example, the web client 418 may include the signed header and the authorization code in a header of a message, such as an HTTP message, which may be an example of a message illustrated by and described with reference to FIG. 2.

In some examples, at 475, the software platform 425 may validate the header. For example, the proof-of-possession endpoint 428 or the authorization endpoint, or both, may validate (e.g., verify) the signature of the header using the public key. In some examples, such as in response to validating the header, the software platform 425 (e.g., via the proof-of-possession endpoint 428) may transmit a nonce to the client device 405 (e.g., to the web client 418 of the client device 405). That is, the nonce may be received by the web client 418 from the server of the software platform 425. In response, the web client 418 may pass the nonce to the authentication client 416 via the loopback interface (e.g., through a loopback call).

In some examples, the authentication client 416 may update the header in response to receiving the nonce. For example, the authentication client 416 may be configured to collect device signals (e.g., attributes of the client device 405). In such an example, the authentication client 416 may sign the header with one or more device signals (e.g., collected in response to receiving the nonce, or prior to receiving the nonce) and the nonce using the private key, which the authentication client 416 may access via the system interface. In some examples, adding one or more device signals (e.g., any type of device signal) to the header may increase security associated with the header. The authentication client 416 may transmit the signed header (e.g., the updated header with the device signals and the nonce) to the software platform 425 via the web client 418.

At 480, the software platform 425 may transmit (e.g., via the authorization endpoint 427) one or more device-bound tokens (e.g., a device-bound access token and a device-bound refresh token, a cookie). In other words, in response to transmitting the deigned header to the software platform 425, the client device 405 may receive (e.g., via the web client 418) an access token and a refresh token that are bound to the client device 405 (e.g., bound to the signed DPoP header). That is, a piece of artifact for trust (e.g., any piece of artifact for trust, such as a token or cookie) may be linked with the public key. Accordingly, the piece of artifact for trust may be protected by the DPoP header (e.g., and bound to the client device 405).

The client device 405 (e.g., a user of the client device 405) may use the bound access token to access resources and the refresh token to obtain additional access tokens (e.g., due to the obtained access token having an associated lifetime, such as an hour or another suitable duration). For example, the client device 405 may transmit a request for a second access token based on identifying an expiration of the access token, in which the request includes the refresh token and the header. In such an example, the client device 405 may obtain a second access token (e.g., or renewal of the existing access token) based on the refresh token and the header being signed with the one or more device signals. That is, the device signals may be passed to the software platform 425 (e.g., a token endpoint of the IdP, the authorization endpoint 426) so that the software platform 425 may use the device signals to define a token policy (e.g., grant another access token or renew an existing access token).

In some examples, at 485, the client device 405 may transmit an access request to the resource server 430 that includes the access token (e.g., and the signed header). The request may be for access to a resource stored at the resource server 430 (e.g., a resource of the organization). In some examples, the client device 405 may transmit the access request via the web client 418. In other words, the web client 418 may transmit the access token the header (e.g., a DPoP token, a DPoP JWT) to the resource server 430, for example, to prevent a replay attack. The header (e.g., the DPoP JWT) may include a nonce (e.g., a different nonce, a new nonce) or a JWT identifier (JTI) (e.g., a new JTI). In some examples, device signals may be re-collected and signed into the header (e.g., the updated header, the new DPoP). For example, in addition to the DPoP claim (e.g., a standard DPoP claim), the authentication client 416 may add device signals (e.g., management status) in the DPoP claims. In such examples, the device signals (e.g., the re-collected device signals) may be used to define an access policy. For example, the resource server 430 may determine whether to grant access to the client device based on the device signals.

In such examples, at 490, the resource server 430 may validate the header with the software platform 425 (e.g., with the proof-of-possession endpoint 428 of the software platform 425). For example, the software platform 425 may have embedded the public key in the access token and the resource server 430 may use the embedded public key to validate the header (e.g., to validate the signature of the header). Additionally, or alternatively, the resource server 430 may validate the header by querying the software platform 425 (e.g., at the proof-of-possession endpoint of the software platform 425). In some examples, the client device 405 may obtain access to the resource based on the access token including the header (e.g., based on the resource server 430 validating the header, thereby validating the client device 405). In some examples, using a device-bound token (e.g., the access token) to obtain access to the resource may provide increased security for the organization, among other benefits.

Figure 5:
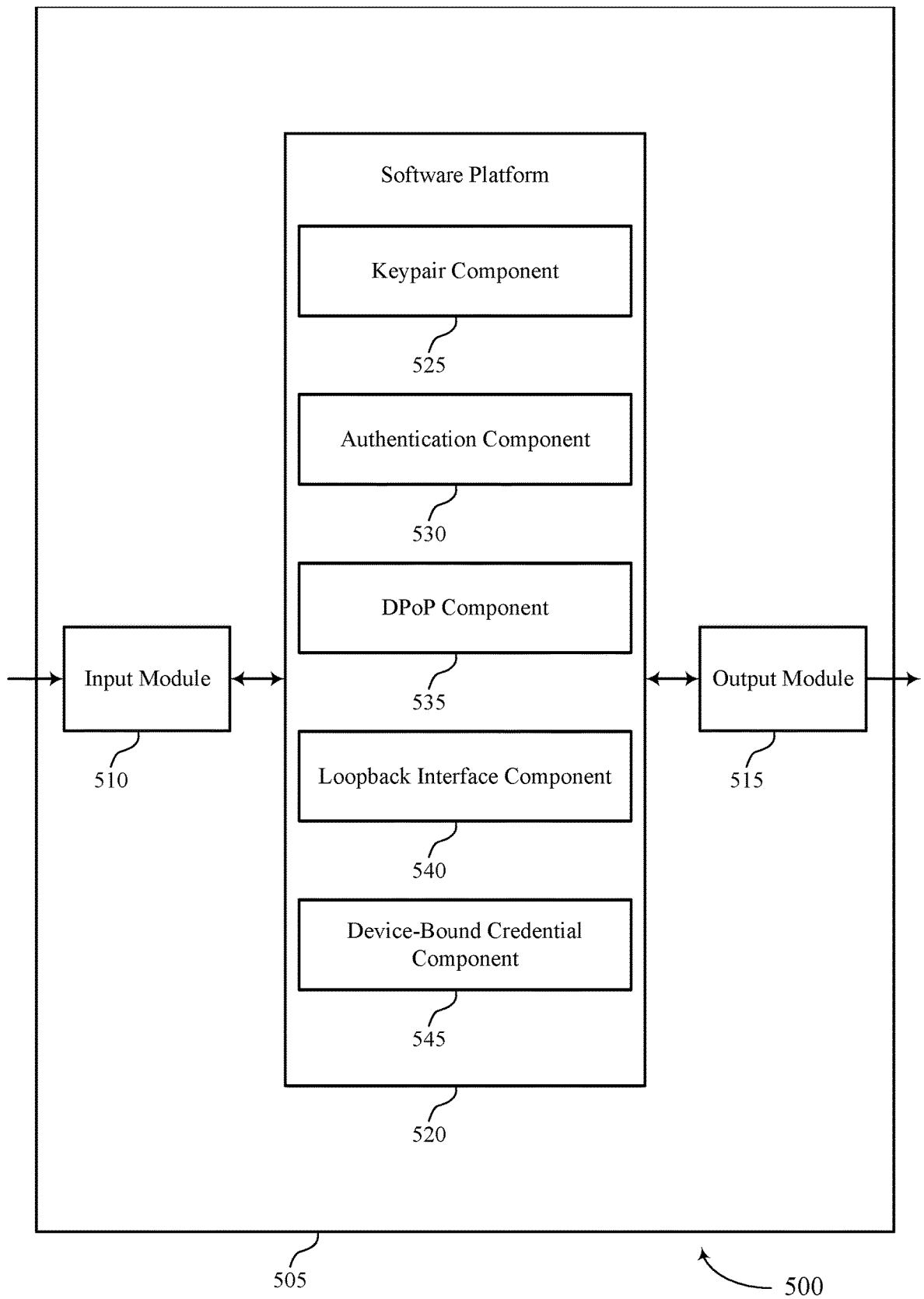
FIG. 5 shows a block diagram of an apparatus that supports techniques for binding tokens to a device and collecting device posture signals in accordance with aspects of the present disclosure.

FIG. 5 shows a block diagram 500 of a device 505 that supports techniques for binding tokens to a device in accordance with aspects of the present disclosure. The device 505 may include an input module 510, an output module 515, and a software platform 520. The device 505, or one or more components of the device 505 (e.g., the input module 510, the output module 515, and the software platform 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX, LINUX®, or another known operating system to handle input signals. The input module 510 may send aspects of these input signals to other components of the device 505 for processing. For example, the input module 510 may transmit input signals to the software platform 520 to support techniques for binding tokens to a device. In some cases, the input module 510 may be a component of an I/O controller 710 as described with reference to FIG. 7.

The output module 515 may manage output signals for the device 505. For example, the output module 515 may receive signals from other components of the device 505, such as the software platform 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the software platform 520 may include a keypair component 525, an authentication component 530, a DPoP component 535, a loopback interface component 540, a device-bound credential component 545, or any combination thereof. In some examples, the software platform 520, or various components thereof, may be configured to perform various operations (e.g., receiving, monitoring, transmitting) using or otherwise in cooperation with the input module 510, the output module 515, or both. For example, the software platform 520) may receive information from the input module 510, send information to the output module 515, or be integrated in combination with the input module 510, the output module 515, or both to receive information, transmit information, or perform various other operations as described herein.

The software platform 520 may support user authentication on a first device in accordance with examples as disclosed herein. The keypair component 525 may be configured as or otherwise support a means for generating a proof-of-possession keypair at a secure module of the first device, where the proof-of-possession keypair includes a public key and a private key, and where the private key is stored at the secure module. The authentication component 530 may be configured as or otherwise support a means for performing a sequence of operations to authenticate the first device and a user of the first device with an identity management platform. The DPoP component 535 may be configured as or otherwise support a means for generating a header at an authentication client of the first device based on the authenticating, where the header is generated in accordance with an application-layer protocol for demonstrating proof-of-possession. The loopback interface component 540) may be configured as or otherwise support a means for signing the header with the private key based on a web client of the first device invoking the authentication client via a loopback interface and the authentication client accessing the secure module via a system interface. The DPoP component 535 may be configured as or otherwise support a means for transmitting the signed header to a server associated with the identity management platform via the web client.

Additionally, or alternatively, the software platform 520 may support user authentication on a first device in accordance with examples as disclosed herein. The keypair component 525 may be configured as or otherwise support a means for generating a first proof-of-possession keypair and a second proof-of-possession keypair at a secure module of the first device. The authentication component 530 may be configured as or otherwise support a means for generating a device credential at an authentication client of the first device based on the first proof-of-possession keypair. The device-bound credential component 545 may be configured as or otherwise support a means for obtaining a device-bound user credential via the authentication client, where the device-bound user credential is obtained from a second device associated with the identity management platform based on the device credential and the second proof-of-possession keypair.

Figure 6:
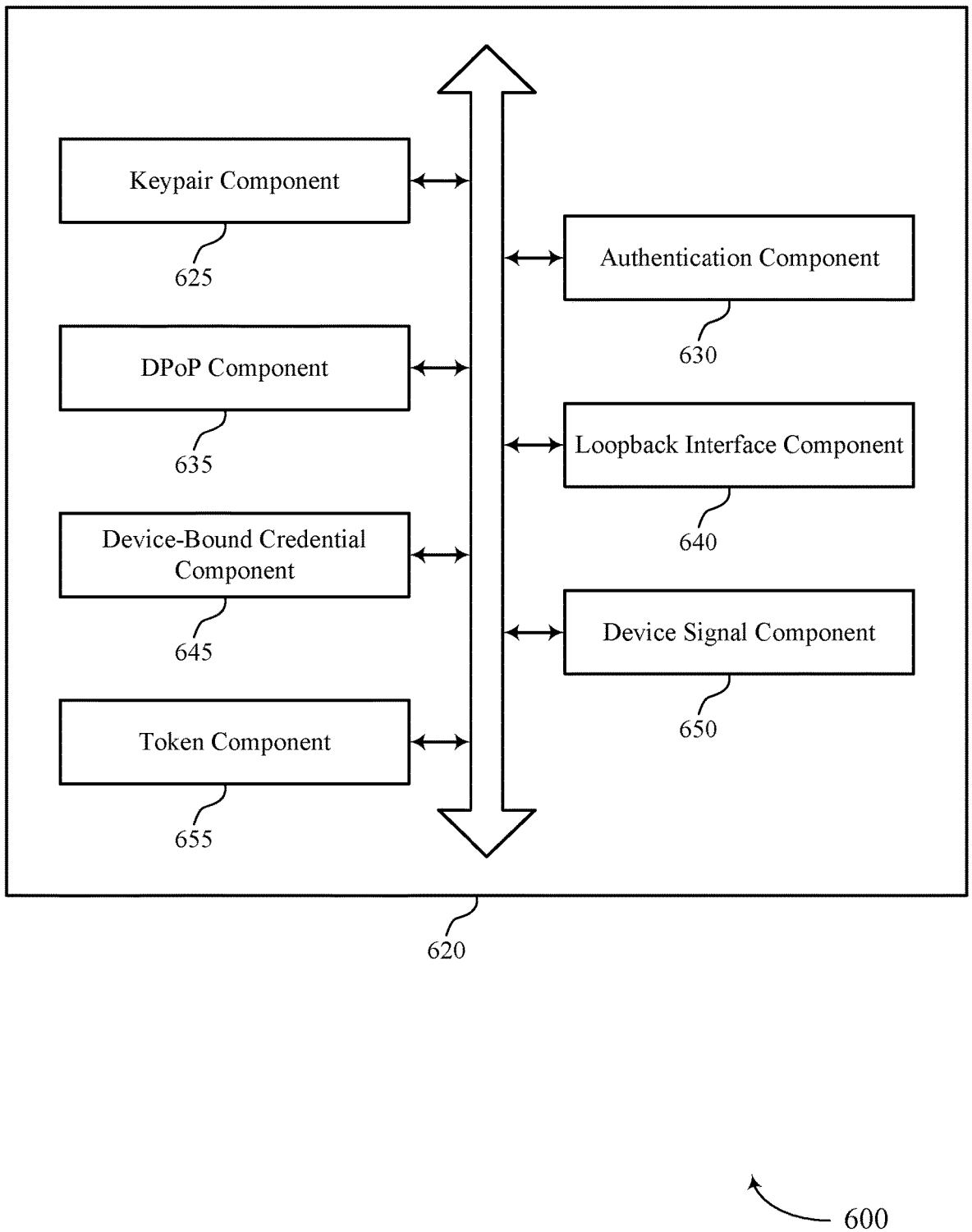
FIG. 6 shows a block diagram of a software platform that supports techniques for binding tokens to a device and collecting device posture signals in accordance with aspects of the present disclosure.

FIG. 6 shows a block diagram 600 of a software platform 620 that supports techniques for binding tokens to a device in accordance with aspects of the present disclosure. The software platform 620 may be an example of aspects of a software platform or a software platform 520, or both, as described herein. The software platform 620, or various components thereof, may be an example of means for performing various aspects of techniques for binding tokens to a device as described herein. For example, the software platform 620 may include a keypair component 625, an authentication component 630, a DPoP component 635, a loopback interface component 640, a device-bound credential component 645, a device signal component 650), a token component 655, or any combination thereof. Each of these components, or components of subcomponents thereof (e.g., one or more processors, one or more memories), may communicate, directly or indirectly, with one another (e.g., via one or more buses).

The software platform 620 may support user authentication on a first device in accordance with examples as disclosed herein. The keypair component 625 may be configured as or otherwise support a means for generating a proof-of-possession keypair at a secure module of the first device, where the proof-of-possession keypair includes a public key and a private key, and where the private key is stored at the secure module. The authentication component 630 may be configured as or otherwise support a means for performing a sequence of operations to authenticate the first device and a user of the first device with an identity management platform. The DPoP component 635 may be configured as or otherwise support a means for generating a header at an authentication client of the first device based on the authenticating, where the header is generated in accordance with an application-layer protocol for demonstrating proof-of-possession. The loopback interface component 640) may be configured as or otherwise support a means for signing the header with the private key based on a web client of the first device invoking the authentication client via a loopback interface and the authentication client accessing the secure module via a system interface. In some examples, the DPoP component 635 may be configured as or otherwise support a means for transmitting the signed header to a server associated with the identity management platform via the web client.

In some examples, the authentication component 630 may be configured as or otherwise support a means for receiving a nonce via the web client based on validating the header with the identity management platform using the public key. In some examples, the device signal component 650 may be configured as or otherwise support a means for obtaining one or more device signals at the authentication client of the first device in response to receiving the nonce and based on the web client invoking the authentication client via the loopback interface. In some examples, the loopback interface component 640 may be configured as or otherwise support a means for signing the header with the private key, the nonce, and the one or more device signals based on the authentication client accessing the secure module via the system interface. In some examples, the DPoP component 635 may be configured as or otherwise support a means for transmitting the header to the server via the web client.

In some examples, each device signal of the one or more device signals correspond to a respective attribute of one or more attributes collectable by the authentication client. In some examples, the one or more attributes include security data that pertains to the first device.

In some examples, the one or more attributes include an attestation of a management status of the first device, an operating system version of the first device, a status of one or more anti-virus products on the first device, an anti-virus setting of the first device, a firewall setting of the first device, a status of a firewall on the first device, a screen-lock type of the first device, a risk score of the first device, a status of one or more auto-update settings on the first device, a status of one or more internet settings on the first device, a status of a user account control on the first device, or a status of an operating system security center service, or any combination thereof.

In some examples, the token component 655 may be configured as or otherwise support a means for receiving an access token and a refresh token via the web client based on validating the header with the identity management platform using the public key, where the access token and the refresh token are bound to the first device and include the header.

In some examples, the token component 655 may be configured as or otherwise support a means for transmitting a request to a resource server for access to a resource, where the request is transmitted via the web client and includes the access token and the header. being signed with the one or more device signals. In some examples, the DPoP component 635 may be configured as or otherwise support a means for obtaining access to the resource based on the access token and the header.

In some examples, the token component 655 may be configured as or otherwise support a means for transmitting, to the server associated with the identity management platform, a request for a second access token based on identifying an expiration of the access token, where the request includes the refresh token and the header. In some examples, the token component 655 may be configured as or otherwise support a means for obtaining the second access token based on the refresh token and the header being signed with the one or more device signals.

In some examples, the sequence of operations are performed in response to a request, from the user, to access a resource via the web client.

Additionally, or alternatively, the software platform 620 may support user authentication on a first device in accordance with examples as disclosed herein. In some examples, the keypair component 625 may be configured as or otherwise support a means for generating a first proof-of-possession keypair and a second proof-of-possession keypair at a secure module of the first device. In some examples, the authentication component 630 may be configured as or otherwise support a means for generating a device credential at an authentication client of the first device based on the first proof-of-possession keypair. The device-bound credential component 645 may be configured as or otherwise support a means for obtaining a device-bound user credential via the authentication client, where the device-bound user credential is obtained from a second device associated with the identity management platform based on the device credential and the second proof-of-possession keypair.

In some examples, the device-bound user credential is obtained in response to a request, from a user of the first device, to log into the first device.

In some examples, the device-bound user credential satisfies one or more assurances associated with accessing a resource via the first device.

In some examples, the authentication component 630 may be configured as or otherwise support a means for performing a sequence of operations to register the first device with an identity management platform, where obtaining the device-bound user credential from the server associated with the identity management platform is based on the first device being registered.

Figure 7:
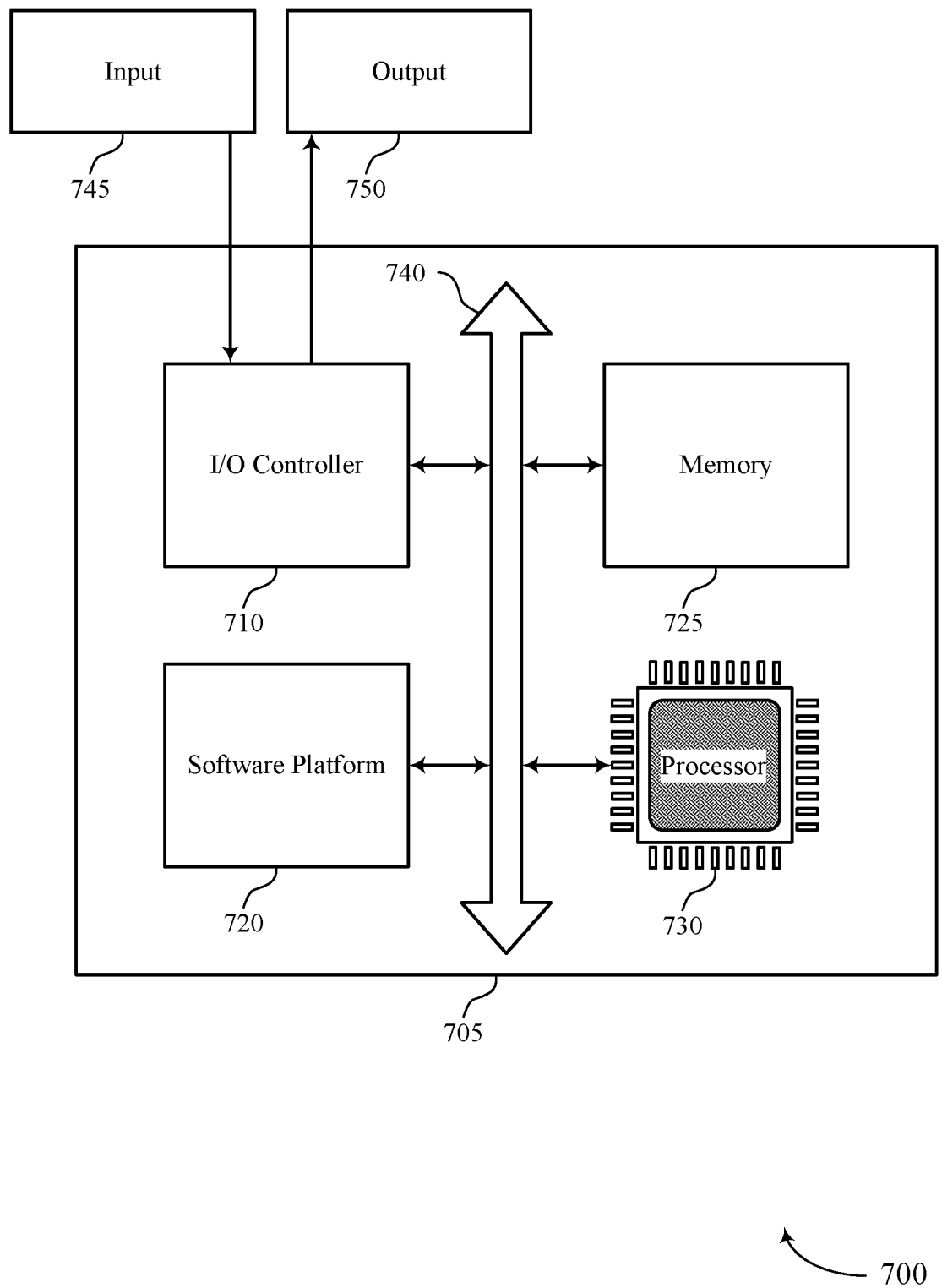
FIG. 7 shows a diagram of a system including a device that supports techniques for binding tokens to a device and collecting device posture signals in accordance with aspects of the present disclosure.

FIG. 7 shows a diagram of a system 700 including a device 705 that supports techniques for binding tokens to a device and collecting device posture signals in accordance with aspects of the present disclosure. The device 705 may be an example of or include the components of a device 505 as described herein. The device 705 may include components for bi-directional data communications including components for transmitting and receiving communications, such as a software platform 720, an I/O controller 710, at least one memory 725, and at least one processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause at least one processor 730 to perform various functions described herein. In some cases, the memory 725 may contain, among other things, a BIOS which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting techniques for binding tokens to a device and collecting device posture signals). The processor 730 may be an example of a single processor or multiple processors. For example, the device 705 may include one or more processors 730).

The software platform 720 may support user authentication on a first device in accordance with examples as disclosed herein. For example, the software platform 720 may be configured as or otherwise support a means for generating a proof-of-possession keypair at a secure module of the first device, where the proof-of-possession keypair includes a public key and a private key, and where the private key is stored at the secure module. The software platform 720 may be configured as or otherwise support a means for performing a sequence of operations to authenticate the first device and a user of the first device with an identity management platform. The software platform 720 may be configured as or otherwise support a means for generating a header at an authentication client of the first device based on the authenticating, where the header is generated in accordance with an application-layer protocol for demonstrating proof-of-possession. The software platform 720 may be configured as or otherwise support a means for signing the header with the private key based on a web client of the first device invoking the authentication client via a loopback interface and the authentication client accessing the secure module via a system interface. The software platform 720 may be configured as or otherwise support a means for transmitting the signed header to a server associated with the identity management platform via the web client.

Additionally, or alternatively, the software platform 720 may support user authentication on a first device in accordance with examples as disclosed herein. For example, the software platform 720 may be configured as or otherwise support a means for generating a first proof-of-possession keypair and a second proof-of-possession keypair at a secure module of the first device. The software platform 720 may be configured as or otherwise support a means for generating a device credential at an authentication client of the first device based on the first proof-of-possession keypair. The software platform 720 may be configured as or otherwise support a means for obtaining a device-bound user credential via the authentication client, where the device-bound user credential is obtained from a second device associated with the identity management platform based on the device credential and the second proof-of-possession keypair.

By including or configuring the software platform 720 in accordance with examples as described herein, the device 705 may support techniques for improved communication reliability, reduced latency, and more efficient utilization of communication resources.

Figure 8:
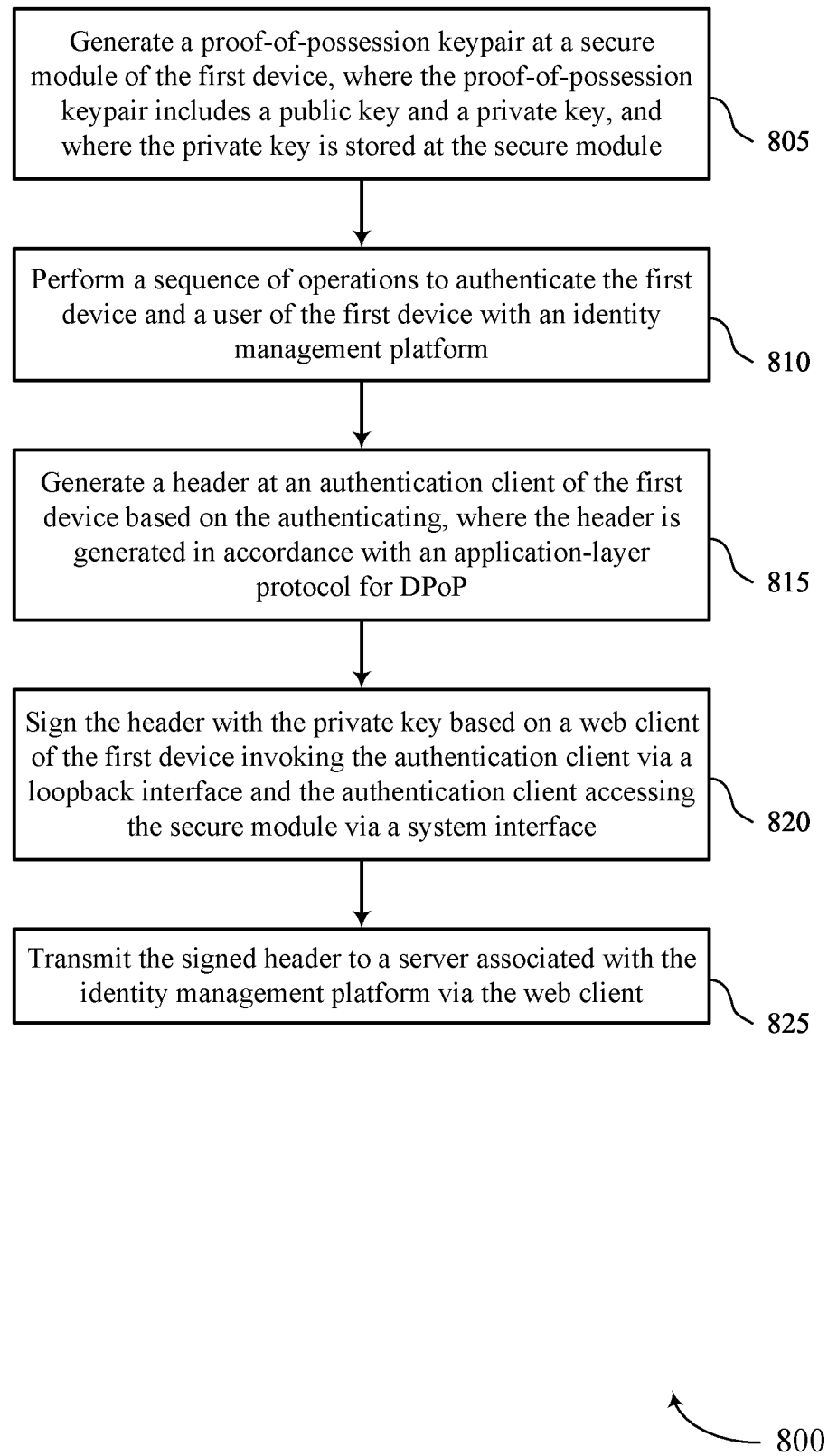
FIGS. 8 and 9 show flowcharts illustrating methods that support techniques for binding tokens to a device and collecting device posture signals in accordance with aspects of the present disclosure.

FIG. 8 shows a flowchart illustrating a method 800 that supports techniques for binding tokens to a device and collecting device posture signals in accordance with aspects of the present disclosure. The operations of the method 800 may be implemented by a device or its components as described herein. For example, the operations of the method 800 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 805, the method may include generating a proof-of-possession keypair at a secure module of the first device, where the proof-of-possession keypair includes a public key and a private key, and where the private key is stored at the secure module. The operations of block 805 may be performed in accordance with examples as disclosed herein. In some examples, aspects of the operations of 805 may be performed by a keypair component 625 as described with reference to FIG. 6.

At 810, the method may include performing a sequence of operations to authenticate the first device and a user of the first device with an identity management platform. The operations of block 810 may be performed in accordance with examples as disclosed herein. In some examples, aspects of the operations of 810 may be performed by an authentication component 630 as described with reference to FIG. 6.

At 815, the method may include generating a header at an authentication client of the first device based on the authenticating, where the header is generated in accordance with an application-layer protocol for DPoP. The operations of block 815 may be performed in accordance with examples as disclosed herein. In some examples, aspects of the operations of 815 may be performed by a DPoP component 635 as described with reference to FIG. 6.

At 820, the method may include signing the header with the private key based on a web client of the first device invoking the authentication client via a loopback interface and the authentication client accessing the secure module via a system interface. The operations of block 820 may be performed in accordance with examples as disclosed herein. In some examples, aspects of the operations of 820 may be performed by a loopback interface component 640 as described with reference to FIG. 6.

At 825, the method may include transmitting the signed header to a server associated with the identity management platform via the web client. The operations of block 825 may be performed in accordance with examples as disclosed herein. In some examples, aspects of the operations of 825 may be performed by a DPoP component 635 as described with reference to FIG. 6.

Figure 9:
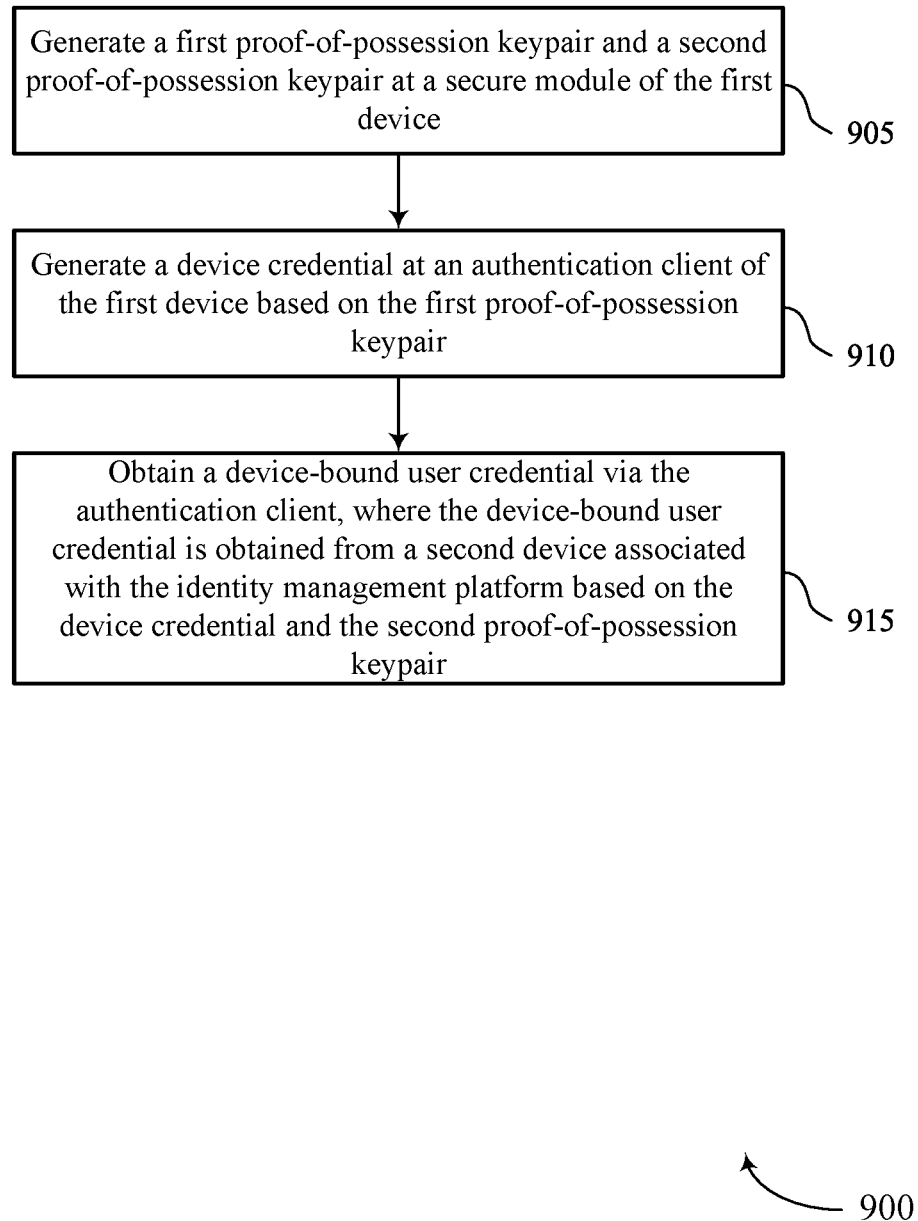

FIG. 9 shows a flowchart illustrating a method 900 that supports techniques for binding tokens to a device and collecting device posture signals in accordance with aspects of the present disclosure. The operations of the method 900 may be implemented by a device or its components as described herein. For example, the operations of the method 900 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 905, the method may include generating a first proof-of-possession keypair and a second proof-of-possession keypair at a secure module of the first device. The operations of block 905 may be performed in accordance with examples as disclosed herein. In some examples, aspects of the operations of 905 may be performed by a keypair component 625 as described with reference to FIG. 6.

At 910, the method may include generating a device credential at an authentication client of the first device based on the first proof-of-possession keypair. The operations of block 910 may be performed in accordance with examples as disclosed herein. In some examples, aspects of the operations of 910 may be performed by an authentication component 630 as described with reference to FIG. 6.

At 915, the method may include obtaining a device-bound user credential via the authentication client, where the device-bound user credential is obtained from a second device associated with the identity management platform based on the device credential and the second proof-of-possession keypair. The operations of block 915 may be performed in accordance with examples as disclosed herein. In some examples, aspects of the operations of 915 may be performed by a device-bound credential component 645 as described with reference to FIG. 6.

The following provides an overview of aspects of the present disclosure:

Aspect 1: A method for user authentication on a first device, comprising: generating a proof-of-possession keypair at a secure module of the first device, wherein the proof-of-possession keypair comprises a public key and a private key, and wherein the private key is stored at the secure module: performing a sequence of operations to authenticate the first device and a user of the first device with an identity management platform: generating a header at an authentication client of the first device based at least in part on the authenticating, wherein the header is generated in accordance with an application-layer protocol for demonstrating proof-of-possession: signing the header with the private key based at least in part on a web client of the first device invoking the authentication client via a loopback interface and the authentication client accessing the secure module via a system interface; and transmitting the signed header to a server associated with the identity management platform via the web client.

Aspect 2: The method of aspect 1, further comprising: receiving a nonce via the web client based at least in part on validating the header with the identity management platform using the public key: obtaining one or more device signals at the authentication client of the first device in response to receiving the nonce and based at least in part on the web client invoking the authentication client via the loopback interface: signing the header with the private key, the nonce, and the one or more device signals based at least in part on the authentication client accessing the secure module via the system interface; and transmitting the header to the server via the web client.

Aspect 3: The method of aspect 2, wherein each device signal of the one or more device signals correspond to a respective attribute of one or more attributes collectable by the authentication client.

Aspect 4: The method of aspect 2, wherein the one or more attributes comprise security data that pertains to the first device.

Aspect 5: The method of aspect 3, wherein the one or more attributes comprise an attestation of a management status of the first device, an operating system version of the first device, a status of one or more anti-virus products on the first device, an anti-virus setting of the first device, a firewall setting of the first device, a status of a firewall on the first device, a screen-lock type of the first device, a risk score of the first device, a status of one or more auto-update settings on the first device, a status of one or more internet settings on the first device, a status of a user account control on the first device, or a status of an operating system security center service, or any combination thereof.

Aspect 6: The method of any of aspects 2 through 5, further comprising: receiving an access token and a refresh token via the web client based at least in part on validating the header with the identity management platform using the public key, wherein the access token and the refresh token are bound to the first device and include the header.

Aspect 7: The method of aspect 6, further comprising: transmitting a request to a resource server for access to a resource, wherein the request is transmitted via the web client and includes the access token and the header; and obtaining access to the resource based at least in part on the access token and the header.

Aspect 8: The method of any of aspects 6 through 7, further comprising: transmitting, to the server associated with the identity management platform, a request for a second access token based at least in part on identifying an expiration of the access token, wherein the request includes the refresh token and the header; and obtaining the second access token based at least in part on the access token and the header.

Aspect 9: The method of any of aspects 1 through 8, wherein the sequence of operations are performed in response to a request, from the user, to access a resource via the web client.

Aspect 10: A method for user authentication on a first device, comprising: generating a first proof-of-possession keypair and a second proof-of-possession keypair at a secure module of the first device: generating a device credential at an authentication client of the first device based at least in part on the first proof-of-possession keypair; and obtaining a device-bound user credential via the authentication client, wherein the device-bound user credential is obtained from a second device associated with the identity management platform based at least in part on the device credential and the second proof-of-possession keypair.

Aspect 11: The method of aspect 10, wherein the device-bound user credential is obtained in response to a request, from a user of the first device, to log into the first device.

Aspect 12: The method of any of aspects 10 through 11, wherein the device-bound user credential satisfies one or more assurances associated with accessing a resource via the first device.

Aspect 13: The method of any of aspects 10 through 12, further comprising: performing a sequence of operations to register the first device with an identity management platform, wherein obtaining the device-bound user credential from the server associated with the identity management platform is based at least in part on the first device being registered.

Aspect 14: An apparatus for user authentication on a first device, comprising one or more memories storing processor-executable code, and one or more processors coupled with the one or more memories and individually or collectively operable to execute the code to cause the apparatus to perform a method of any of aspects 1 through 9.

Aspect 15: An apparatus for user authentication on a first device, comprising at least one means for performing a method of any of aspects 1 through 9.

Aspect 16: A non-transitory computer-readable medium storing code for user authentication on a first device, the code comprising instructions executable by a processor to perform a method of any of aspects 1 through 9.

Aspect 17: An apparatus for user authentication on a first device, comprising one or more memories storing processor-executable code, and one or more processors coupled with the one or more memories and individually or collectively operable to execute the code to cause the apparatus to perform a method of any of aspects 10 through 13.

Aspect 18: An apparatus for user authentication on a first device, comprising at least one means for performing a method of any of aspects 10 through 13.

Aspect 19: A non-transitory computer-readable medium storing code for user authentication on a first device, the code comprising instructions executable by a processor to perform a method of any of aspects 10 through 13.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user authentication on a first device, comprising:
    generating a proof-of-possession keypair at a secure module of the first device, wherein the proof-of-possession keypair comprises a public key and a private key, and wherein the private key is stored at the secure module;
    performing a sequence of operations to authenticate the first device and a user of the first device with an identity management platform;
    generating a header at an authentication client of the first device based at least in part on the authenticating, wherein the header is generated in accordance with an application-layer protocol for demonstrating proof-of-possession;
    receiving a nonce via a web client based at least in part on validating the header with the identity management platform using the public key;
    obtaining one or more device signals at the authentication client of the first device in response to receiving the nonce and based at least in part on the web client invoking the authentication client via a loopback interface;
    signing the header with the private key, the nonce, and the one or more device signals based at least in part on a web client of the first device invoking the authentication client via a loopback interface and the authentication client accessing the secure module via a system interface; and
    transmitting the signed header to a server associated with the identity management platform via the web client.

2. The method of claim 1, wherein each device signal of the one or more device signals correspond to a respective attribute of one or more attributes collectable by the authentication client.

3. The method of claim 2, wherein the one or more attributes comprise security data that pertains to the first device.

4. The method of claim 2, wherein the one or more attributes comprise an attestation of a management status of the first device, an operating system version of the first device, a status of one or more anti-virus products on the first device, an anti-virus setting of the first device, a firewall setting of the first device, a status of a firewall on the first device, a screen-lock type of the first device, a risk score of the first device, a status of one or more auto-update settings on the first device, a status of one or more internet settings on the first device, a status of a user account control on the first device, or a status of an operating system security center service, or any combination thereof.

5. The method of claim 1, further comprising:
    receiving an access token and a refresh token via the web client based at least in part on validating the header with the identity management platform using the public key, wherein the access token and the refresh token are bound to the first device and include the header.

6. The method of claim 5, further comprising:
transmitting a request to a resource server for access to a resource, wherein the request is transmitted via the web client and includes the access token and the header; and
obtaining access to the resource based at least in part on the access token and the header being signed with the one or more device signals.

7. The method of claim 5, further comprising:
transmitting, to the server associated with the identity management platform, a request for a second access token based at least in part on identifying an expiration of the access token, wherein the request includes the refresh token and the header; and
obtaining the second access token based at least in part on the refresh token and the header being signed with the one or more device signals.

8. The method of claim 1, wherein the header comprises a demonstrated proof-of-possession header.

9. The method of claim 1, wherein the sequence of operations are performed in response to a request, from the user, to access a resource via the web client.

10. An apparatus for user authentication on a first device, comprising:
one or more memories storing processor-executable code; and
one or more processors coupled with the one or more memories and individually or collectively operable to execute the code to cause the apparatus to:
generate a proof-of-possession keypair at a secure module of the first device, wherein the proof-of-possession keypair comprises a public key and a private key, and wherein the private key is stored at the secure module;
perform a sequence of operations to authenticate the first device and a user of the first device with an identity management platform;
generate a header at an authentication client of the first device based at least in part on the authenticating, wherein the header is generated in accordance with an application-layer protocol for demonstrating proof-of-possession;
receive a nonce via a web client based at least in part on validating the header with the identity management platform using the public key;
obtain one or more device signals at the authentication client of the first device in response to receiving the nonce and based at least in part on the web client invoking the authentication client via a loopback interface;
sign the header with the private key, the nonce, and the one or more device signals based at least in part on a web client of the first device invoking the authentication client via a loopback interface and the authentication client accessing the secure module via a system interface; and
transmit the signed header to a server associated with the identity management platform via the web client.

11. The apparatus of claim 10, wherein each device signal of the one or more device signals correspond to a respective attribute of one or more attributes collectable by the authentication client.

12. The apparatus of claim 11, wherein the one or more attributes comprise an attestation of a management status of the first device, an operating system version of the first device, a status of one or more anti-virus products on the first device, an anti-virus setting of the first device, a firewall setting of the first device, a status of a firewall on the first device, a screen-lock type of the first device, a risk score of the first device, a status of one or more auto-update settings on the first device, a status of one or more internet settings on the first device, a status of a user account control on the first device, a proof of management status, or a status of an operating system security center service, or any combination thereof.

13. The apparatus of claim 10, wherein the one or more processors are individually or collectively further operable to execute the code to cause the apparatus to:
receive an access token and a refresh token via the web client based at least in part on validating the header with the identity management platform using the public key, wherein the access token and the refresh token are bound to the first device and include the header.

14. The apparatus of claim 13, wherein the one or more processors are individually or collectively further operable to execute the code to cause the apparatus to:
transmit a request to a resource server for access to a resource, wherein the request is transmitted via the web client and includes the access token and the header; and
obtain access to the resource based at least in part on the access token and the header being signed with the one or more device signals.

* * * * *